(12) United States Patent
Smith et al.

(10) Patent No.: US 7,926,862 B2
(45) Date of Patent: Apr. 19, 2011

(54) UTILITY VEHICLE

(75) Inventors: Craig Smith, Newnan, GA (US);
Takashi Yamamura, Shizuoka (JP);
Satoshi Kubota, Shizuoka (JP)

(73) Assignees: Yamaha Hatsudoki Kabushiki Kaisha,
Shizuoka (JP); Yamaha Motor Manufacturing Corporation of America, Newnan, GA (US)

( * ) Notice: Subject to any disclaimer, the term of this patent is extended or adjusted under 35 U.S.C. 154(b) by 0 days.

(21) Appl. No.: 12/360,624

(22) Filed: Jan. 27, 2009

(65) Prior Publication Data
US 2009/0183939 A1 Jul. 23, 2009

Related U.S. Application Data

(63) Continuation of application No. 12/355,854, filed on Jan. 19, 2009, which is a continuation-in-part of application No. 12/017,691, filed on Jan. 22, 2008, now Pat. No. 7,478,861, and a continuation-in-part of application No. 12/017,865, filed on Jan. 22, 2008, and a continuation-in-part of application No. 12/017,783, filed on Jan. 22, 2008.

(51) Int. Cl.
*B60J 7/00* (2006.01)
(52) U.S. Cl. ........................ 296/64; 296/65.13
(58) Field of Classification Search .................. 296/63, 296/64, 65.01, 65.11, 65.13; 297/395, 406, 297/407; D12/1, 16, 28
See application file for complete search history.

(56) References Cited

U.S. PATENT DOCUMENTS

| | | | | |
|---|---|---|---|---|
| 3,145,050 A | * | 8/1964 | Edwards | 297/183.8 |
| 5,924,768 A | * | 7/1999 | Ramos | 297/183.6 |
| 6,460,916 B2 | * | 10/2002 | Mizuta | 296/182.1 |
| D483,695 S | * | 12/2003 | Bellington | D12/16 |
| D498,435 S | * | 11/2004 | Saito et al. | D12/1 |
| D503,905 S | * | 4/2005 | Saito et al. | D12/1 |
| 7,249,798 B2 | | 8/2005 | Saito et al. | |
| D552,509 S | * | 10/2007 | Walkup et al. | D12/16 |
| 7,506,856 B2 | * | 3/2009 | Ikegaya et al. | 248/430 |
| 2004/0195034 A1 | * | 10/2004 | Kato et al. | 180/312 |
| 2009/0021040 A1 | * | 1/2009 | Yamasaki | 296/65.13 |
| 2009/0256388 A1 | * | 10/2009 | Tanaka et al. | 296/186.4 |

FOREIGN PATENT DOCUMENTS

JP 2008296725 A * 12/2008

* cited by examiner

*Primary Examiner* — Joseph D Pape
(74) *Attorney, Agent, or Firm* — Keating & Bennett, LLP

(57) ABSTRACT

A vehicle includes a front seat, provided to the rear, in the forward/back direction of the vehicle, of a front panel, and having a seat cushion portion, a backrest portion that is provided integrally with the seat cushion portion, and a headrest portion that is provided integrally with the backrest portion, wherein at least the backrest portion and the headrest portion are fabricated independently for the left and the right, and wherein the left and right headrest portions are fabricated so that the widths thereof, in the direction of width of the vehicle, are narrower than the widths of, in the direction of width of the vehicle, of the left and right backrest portions.

14 Claims, 22 Drawing Sheets

UTILITY VEHICLE

RELATED APPLICATION

This is a continuation application of U.S. patent application Ser. No. 12/355,854, filed Jan. 19, 2009, now pending, which is a continuation-in-part application of U.S. patent application Ser. No. 12/017,691, filed Jan. 22, 2008, now U.S. Pat. No. 7,478,861; a continuation-in-part application of U.S. patent application Ser. No. 12/017,865, filed Jan. 22, 2008, now pending; and a continuation-in-part application of U.S. patent application Ser. No. 12/017,783, filed Jan. 22, 2008, now pending. The disclosure of U.S. patent application Ser. No. 12/355,854, U.S. patent application Ser. No. 12/017,865, and U.S. patent application Ser. No. 12/017,783 are hereby incorporated by reference.

FIELD OF THE INVENTION

The present invention relates to a vehicle wherein a cabin outer frame is structured from a main body frame with a plurality of roof supports made from pipes that are disposed on both the left and the right side portions of the vehicle frame. Roof members connect the roof supports to each other in a manner to create an interior cabin space. The interior seating components of the cabin space have been designed to further increase the openness of the cabin while enabling the vehicle to be made more compact.

BACKGROUND OF THE INVENTION

U.S. Pat. No. 7,249,798 illustrates a conventional example of an all terrain vehicle that has a front seat and a rear seat disposed behind the front seat. In this conventional vehicle, the upper portion of the cabin is structured by connecting together the top portions of the front, center, and rear roof supports using roof members, producing a cabin with a feeling of openness, while having a front seat and a rear seat.

For such an all terrain vehicle, there are cases wherein it is desirable to further shorten the length of the vehicle, to thereby make the vehicle compact, while maintaining the cabin with a feeling of openness.

However, in the conventional vehicle set forth above, a so-called bench-type seat, which is provided with a single seat cushion portion and a single backrest portion for both the passenger on the left and on the right is used as the front seat, and the backrest portion is supported on a cross member that connects the left and right center roof supports making the design more compact is hindered. Also, because of this, there are problems in that the backrest portion blocks the forward view of the passengers in the rear seat, and interferes with the feeling of openness in the cabin. Furthermore, the cross member for supporting the backrest tends to interfere when the rear seat is moved closer to the front seat, and thus there is a problem in that it is difficult to make the vehicle more compact.

SUMMARY OF THE INVENTION

The present invention is the result of contemplation on the conventional situation set forth above, and the object thereof is to provide a vehicle wherein it is possible to maintain a cabin with a feeling of openness and possible to make the vehicle more compact while still having a front seat and a rear seat, disposed behind the front seat, as seats for seating the passengers.

In the present invention, at least a portion of the backrest of the front seat portions of the left and right seat are independent from each other forming a gap within the backrest portion. This gap ensures the field of view of the rear seat passenger in the forward direction through this space, with the result that it is possible to secure a feeling of openness for the rear seat in the passenger cabin.

In a preferred embodiment, the seat cushion portions and the backrest portions are fabricated integrally, it is possible to have the backrest portion stand up in resistance to the body mass of the passenger, and thus possible to obviate the cross member for supporting the backrest portion or to reduce the diameter thereof, and thus possible to move the rear seat closer to the front seat, with the result that it is possible to make the vehicle more compact.

DETAILED DESCRIPTION OF THE PREFERRED EMBODIMENT

Figure 1:
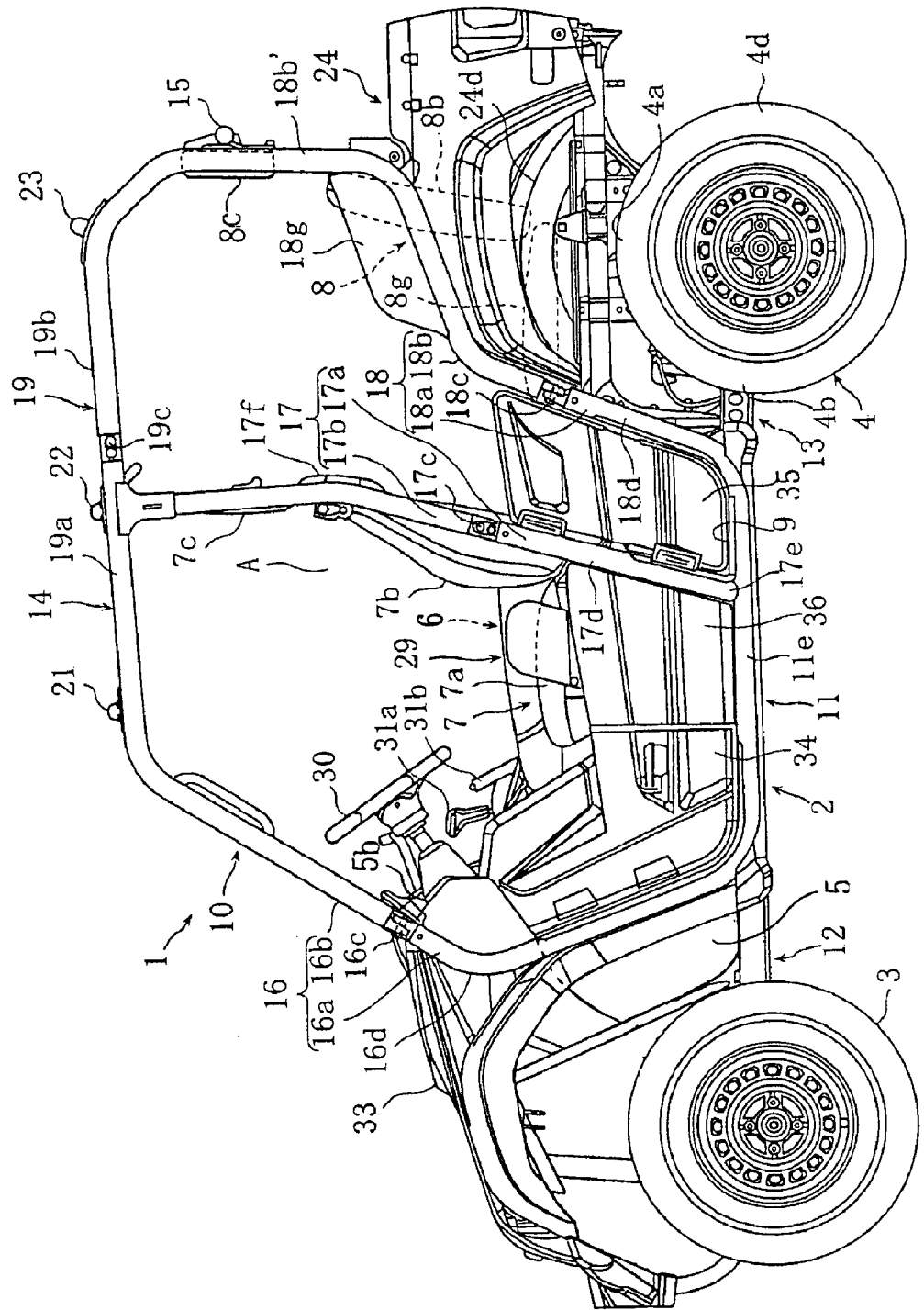
FIG. 1 is a left side view of an all-terrain vehicle as set forth in one embodiment according to the present invention.
Figure 2:
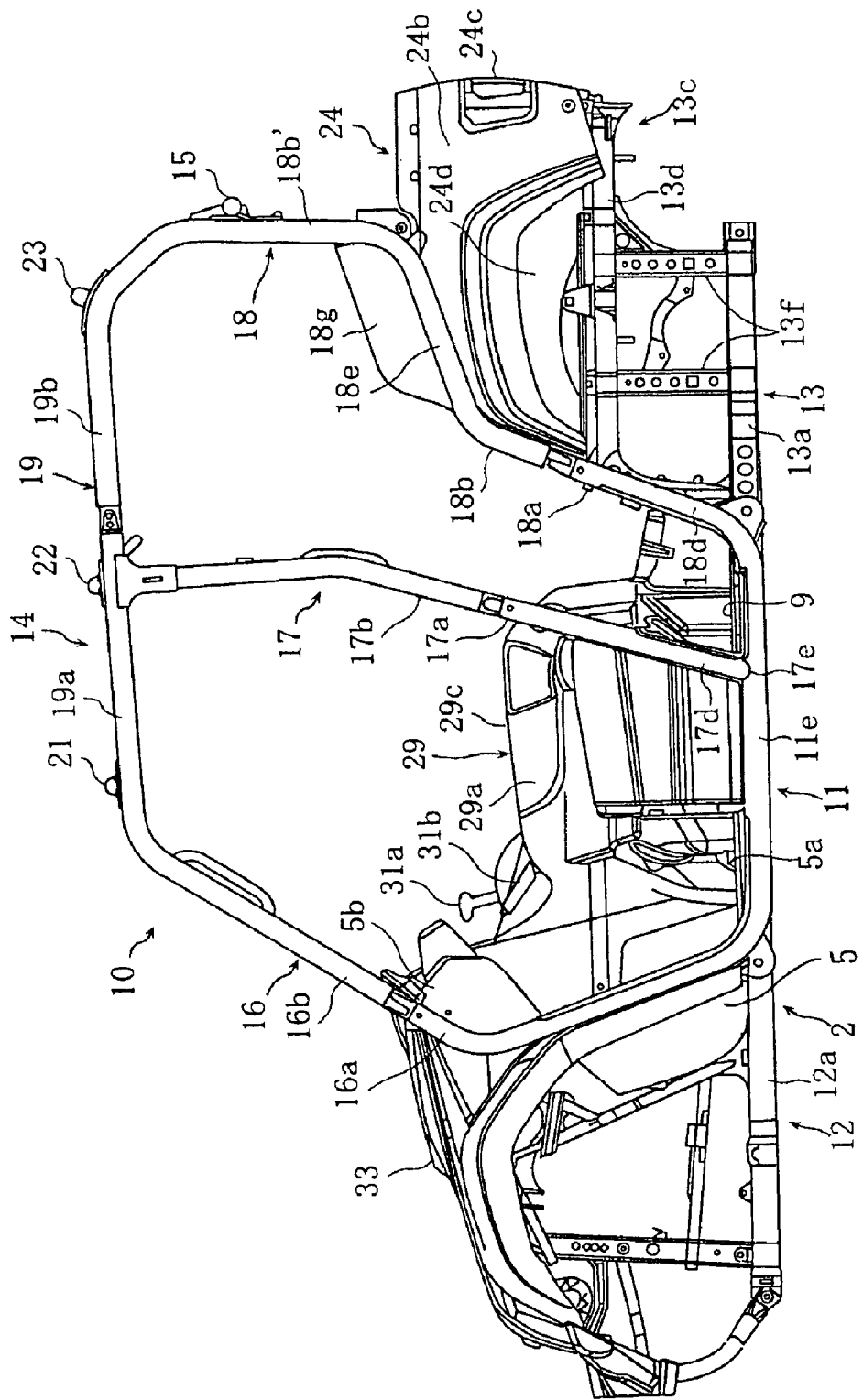
FIG. 2 is a left side view of the state wherein the wheels, seats, doors, etc., have been removed from the vehicle.

A preferred embodiment according to the present invention will be explained below based on the drawings.

FIG. 1 through FIG. 22 illustrate all-terrain vehicle as set forth in one example of embodiment according to the present invention. Note that in the present specification, "front," "forward," "back," "rear," "left," and "right" refer to "front," "forward," "back," "rear," "left," and "right" when seen from the state when seated in a seat, unless otherwise noted. Also, as shown in the Figures like parts are identified with the same numeral. The front wheels are the same on both the left and right sides, so they are referenced by like numeral 3. In some instances only the left side of the vehicle is shown, but it is understood that similar items on the right side, while not shown, are of similar nature.

As shown in the Figures, all-terrain vehicle 1 is provided with a vehicle body frame 2; a pair of left and right front wheels 3 that are supported on the left and right side portions at the forward portion of the vehicle body frame 2; a pair of left and right rear wheels 4 that are supported on the left and right side portions of the rear portion; a front panel 5 that is disposed to the rear of the front wheels 3 of the vehicle body frame 2 in the front/back direction of the vehicle; and an engine unit 6 that is disposed in the center portion, in the direction of width of the vehicle, to the rear, in the front/back direction of the vehicle, of the front panel 5 of the vehicle body frame 2.

Also, a center console, is provided to the rear, in the front/back direction of the vehicle from the front panel, having left and right side walls and a top wall, and having a space therein, disposed extending rearward, in the front/back direction of the vehicle from the center portion, in the direction of width of the vehicle, of the front panel, to at least the back and of the seat, wherein the top wall is disposed at a position that is higher than the bottommost adage of the front portion of a seating surface of a seat cushion portion of a seat and a higher than a top end of the engine and the transmission, and at a position that is lower than the top end of the front panel.

Additionally, the vehicle 1 is provided with: a front seat 7 that is disposed to the rear, in the front/back direction of the vehicle, of the front panel 5 of the vehicle body frame 2; a rear seat 8 that is disposed to the rear, in the front/back direction of the vehicle, of the front seat 7; a rear floor 9 that is disposed at a position that is lower than a top end 4a of the back wheel 4, between, in the front/back direction of the vehicle, the front seat 7 and the rear seat 8; and a cabin structuring member 10, attached to the vehicle body frame 2, for structuring left and right side portions and a ceiling portion 14 forming cabin A.

Vehicle body frame 2 includes a center frame 11 that structures the bottom portion of the cabin A; a front frame 12, connected to the front end of the center frame 11, for structuring the front portion of the vehicle 1; and a rear frame 13, connected to the back end portion of the center frame 11, for structuring the rear portion of the vehicle 1.

Figure 11:
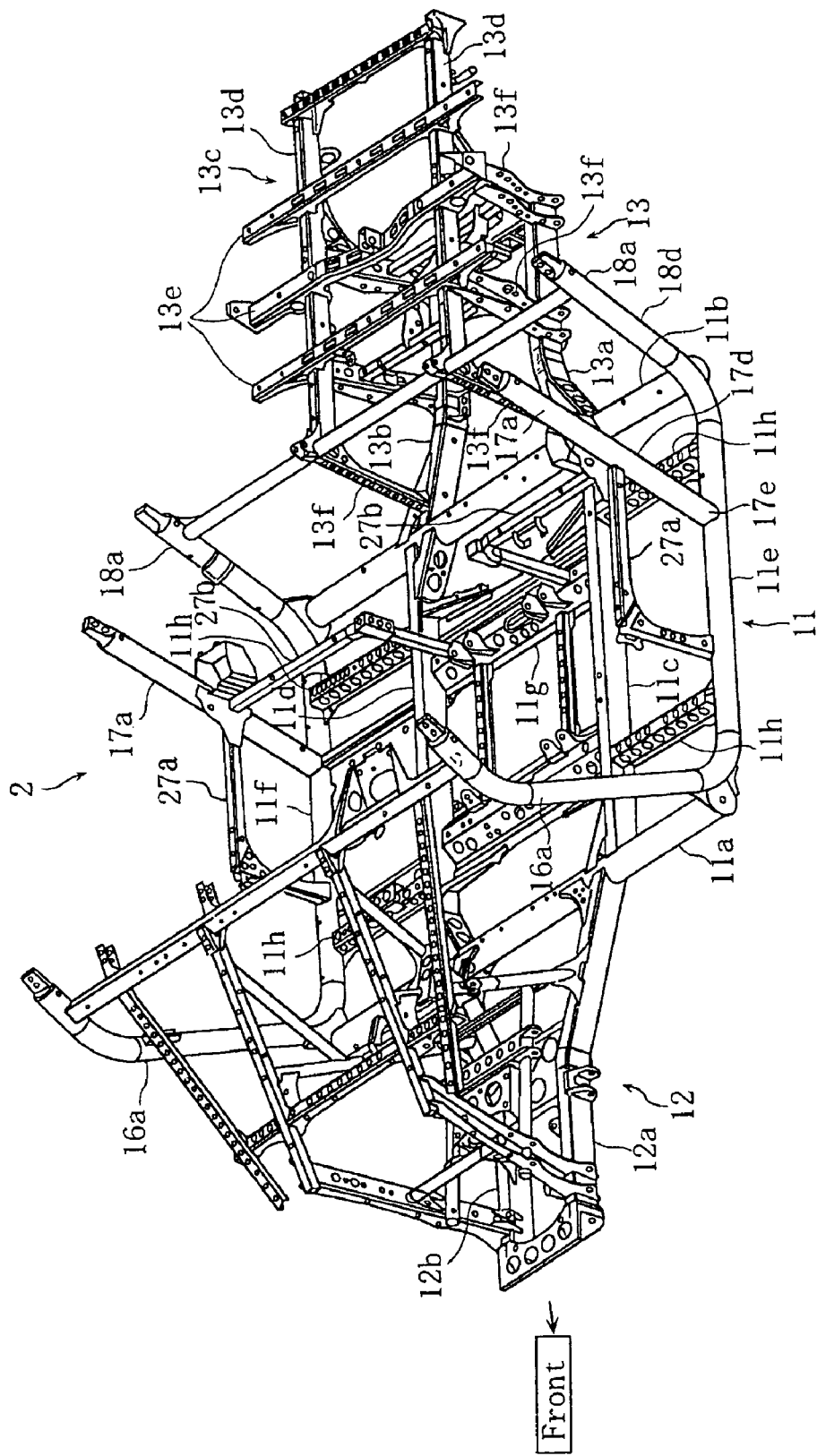
FIG. 11 is an oblique view illustrating the vehicle body frame and the bottom portions of the roof supports.
Figure 12:
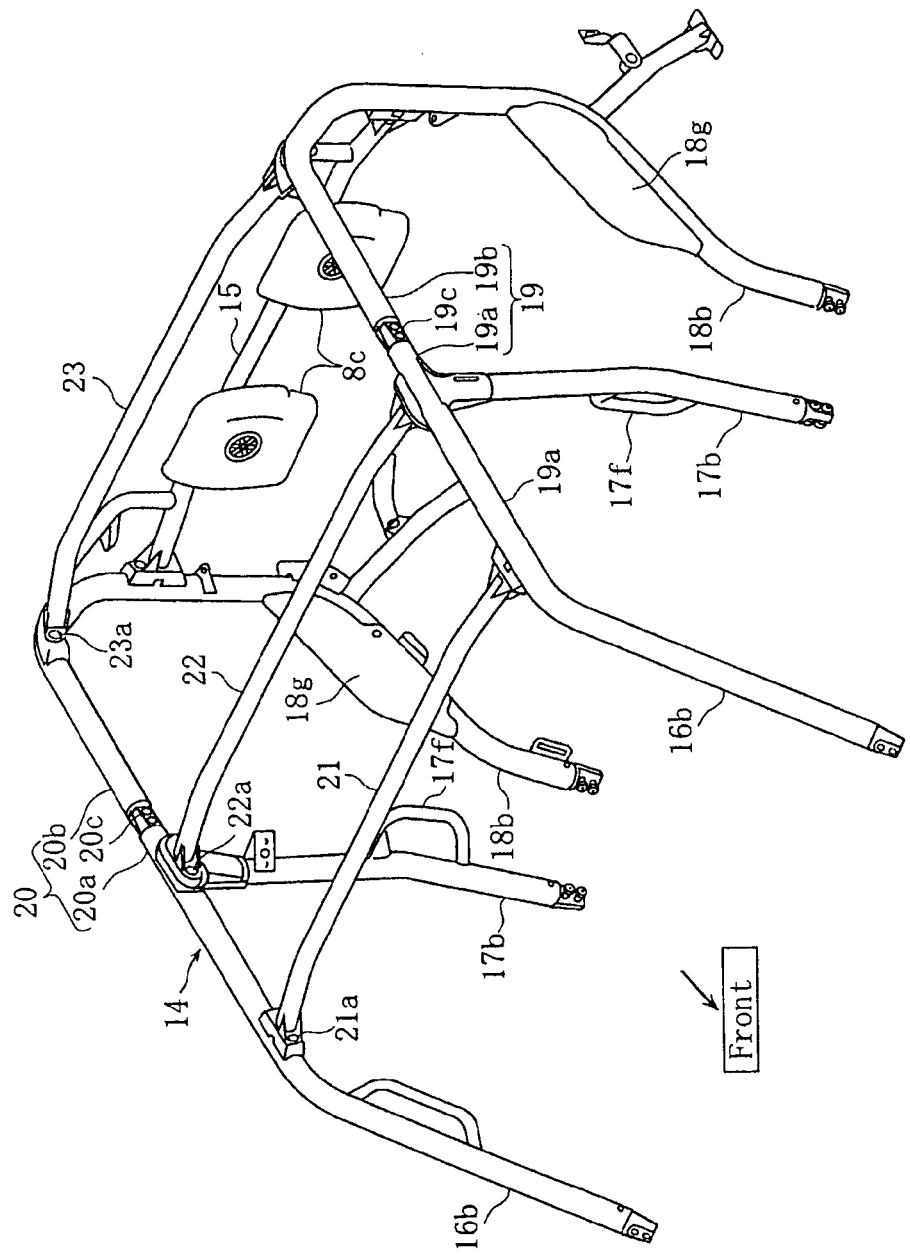
FIG. 12 is an oblique view illustrating the top portions of the roof supports and the roof member.
Figure 13:
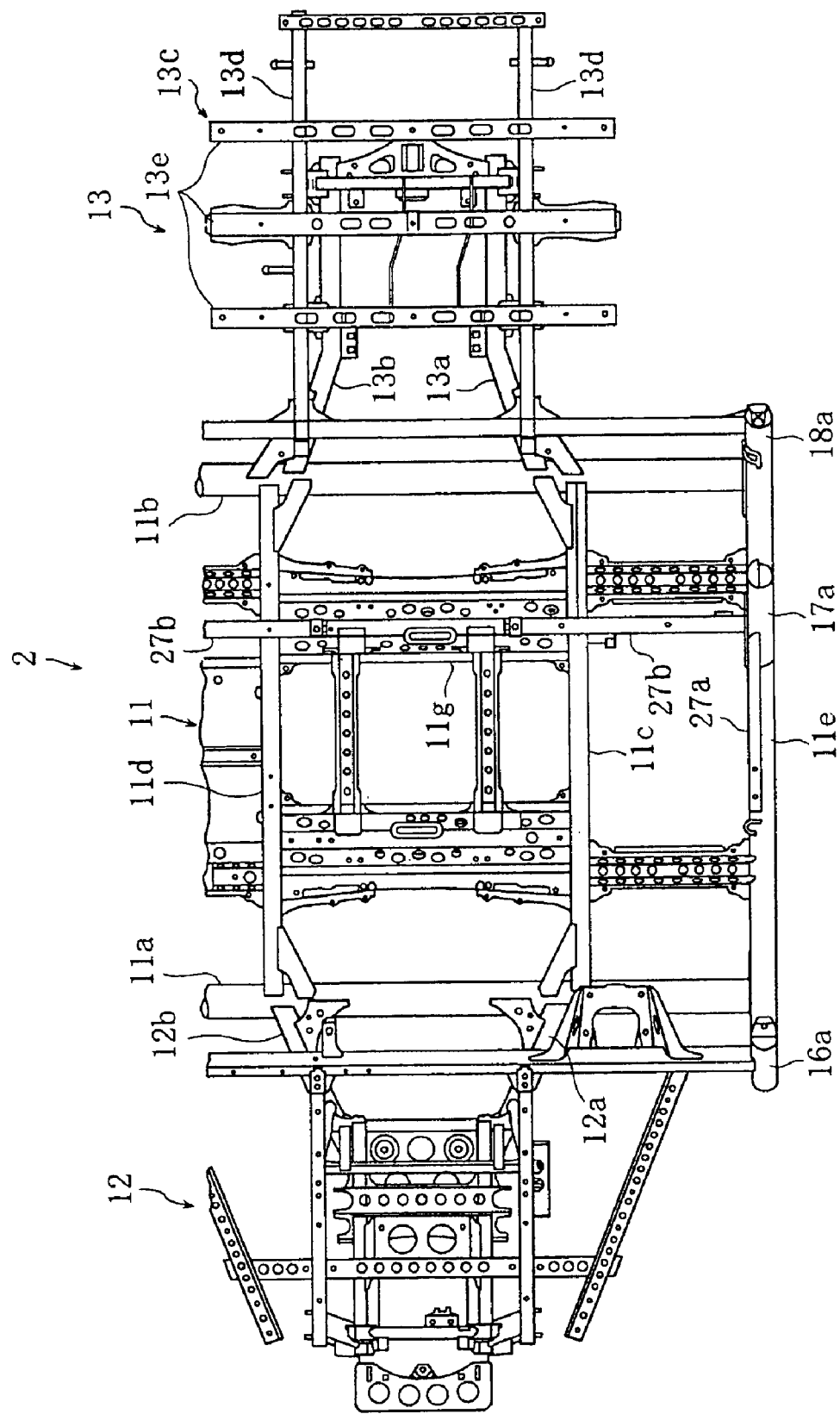
FIG. 13 is a plan view of the vehicle body frame and the bottom portions of the roof supports.
Figure 14:
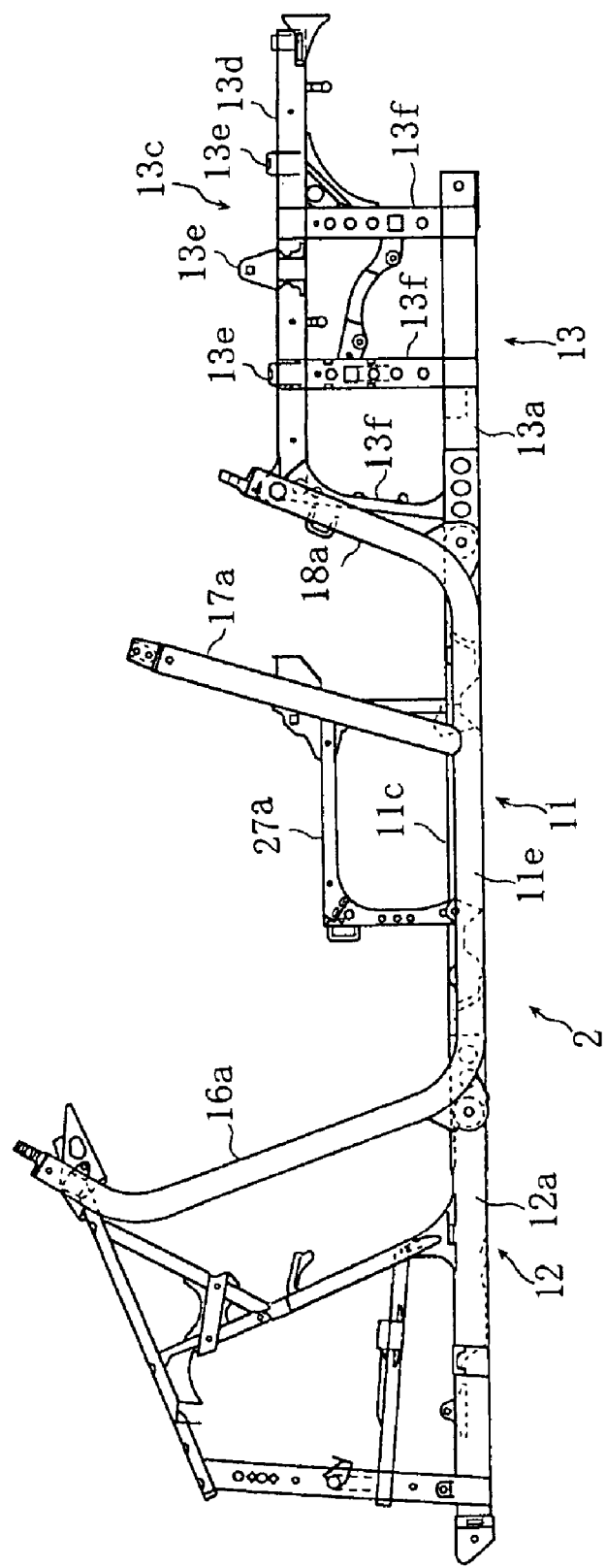
FIG. 14 is a left side view of the vehicle body frame and the bottom portions of the roof supports.
Figure 15:
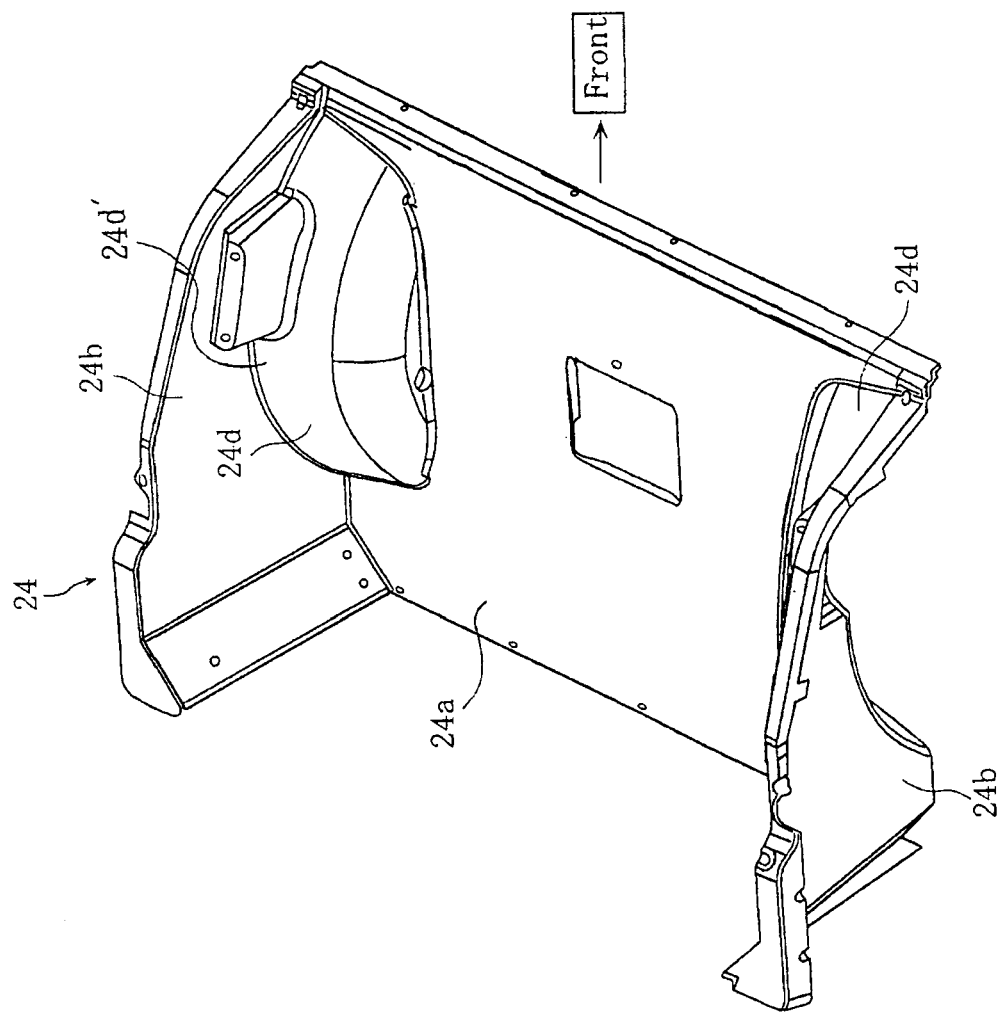
FIG. 15 is an oblique view of a cargo bed.
Figure 16:
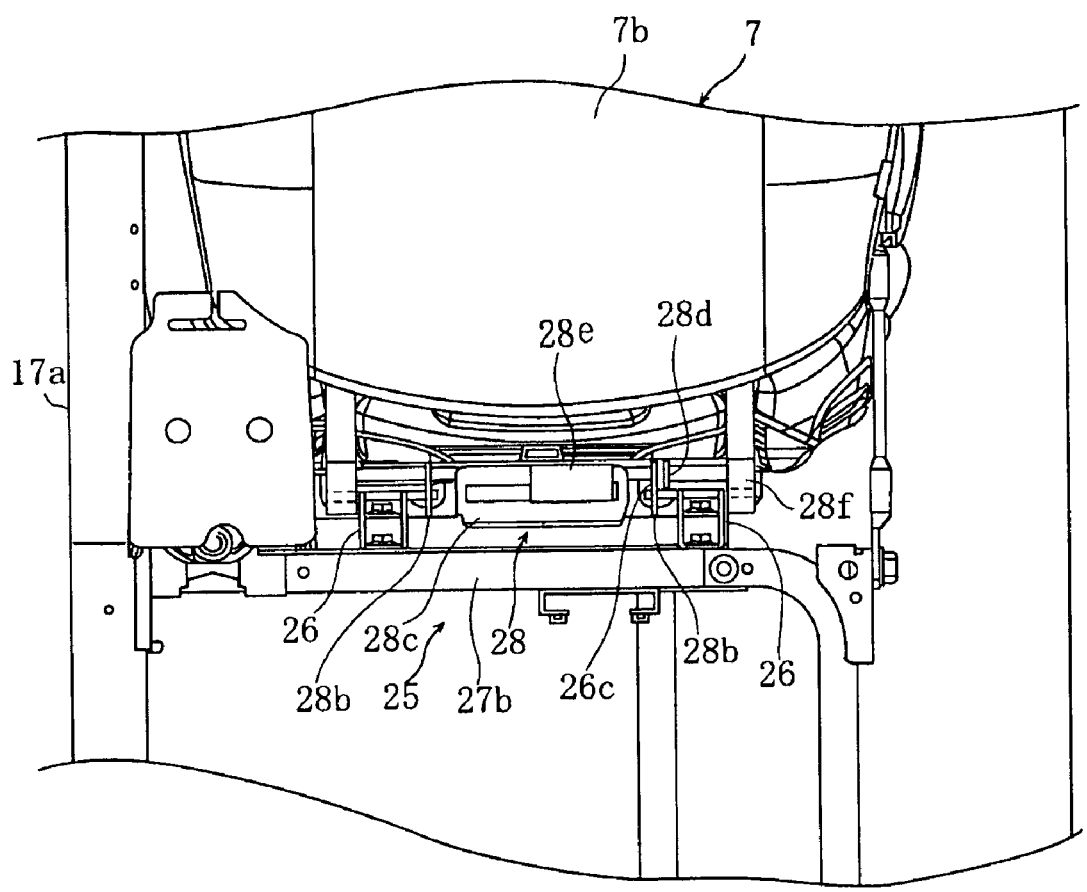
FIG. 16 is a back view of the bottom portion of the front seat.
Figure 17:
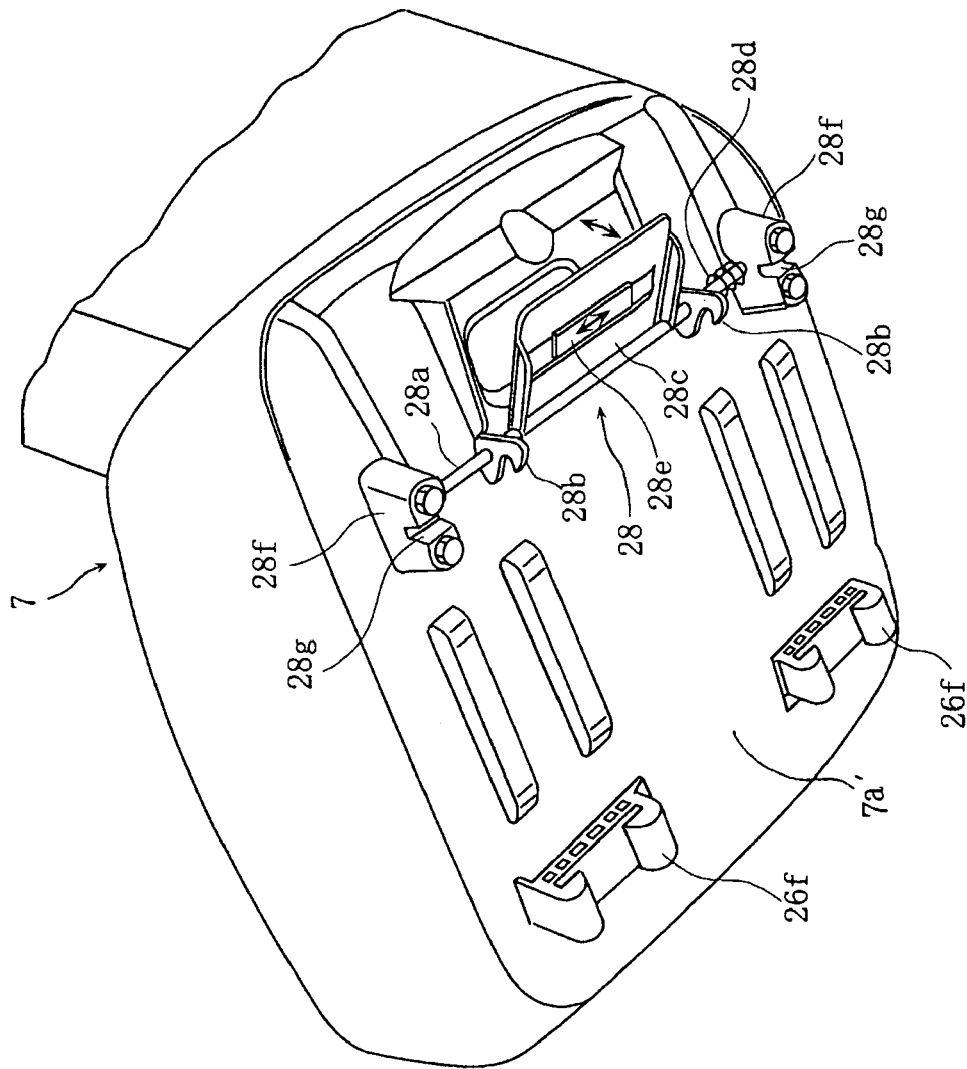
FIG. 17 is an oblique view of the bottom portion of the front seat.
Figure 18:
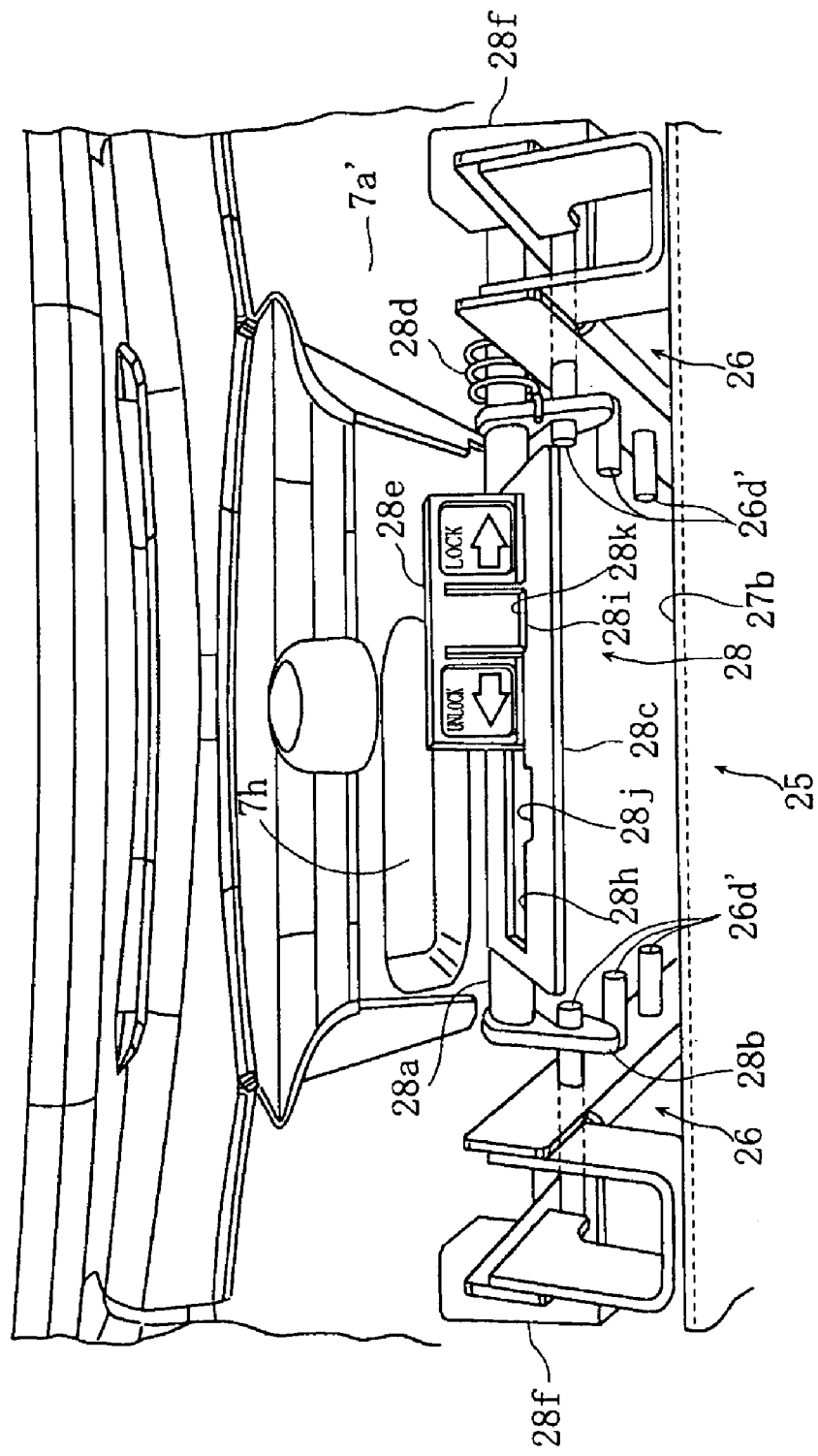
FIG. 18 is a back view of the bottom portion of the front seat.
Figure 19:
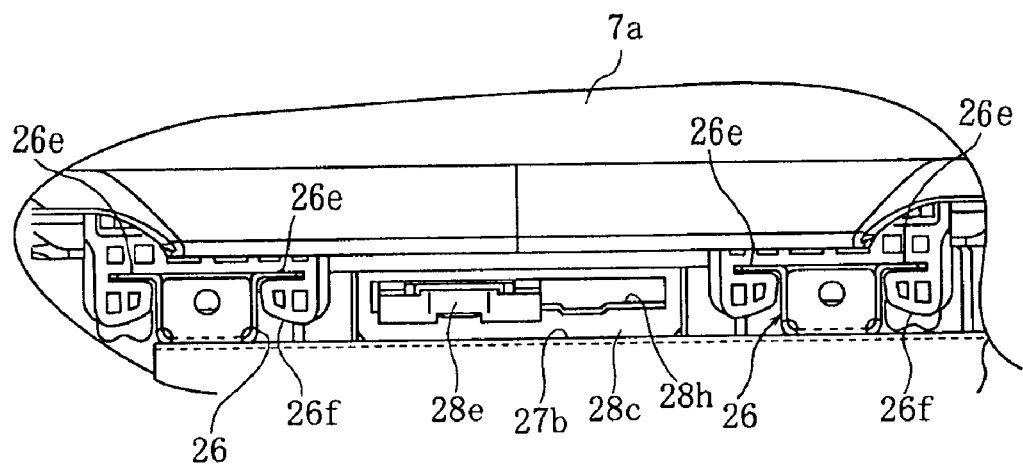
FIG. 19 is a front view of the bottom portion of the front seat.
Figure 20:
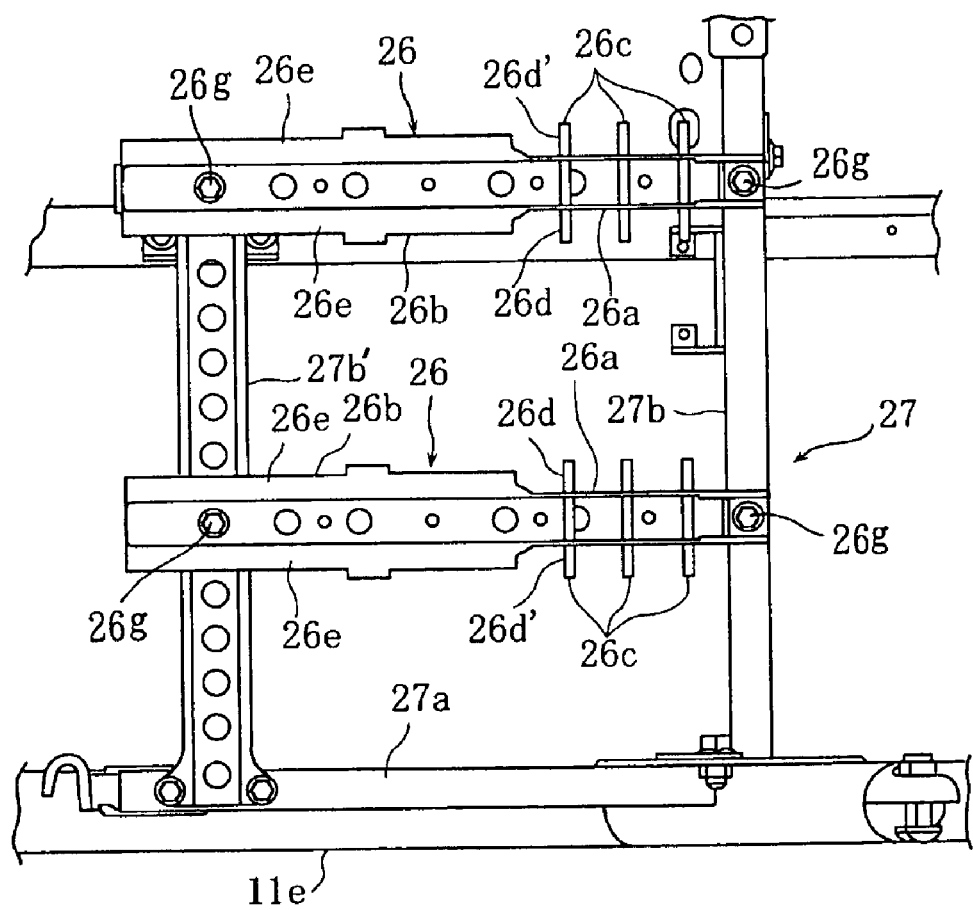
FIG. 20 is a plan view of a seat rail member and a seat bracket.
Figure 21:
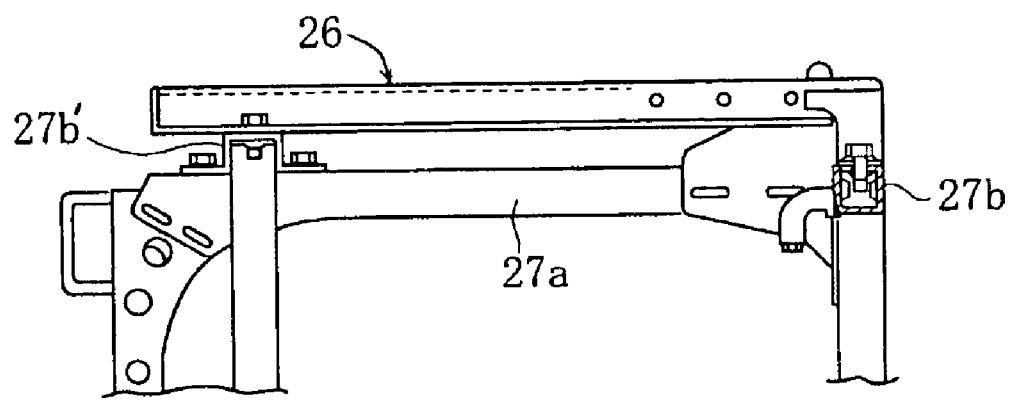
FIG. 21 is a left side view of the seat rail member and the seat bracket.
Figure 22:
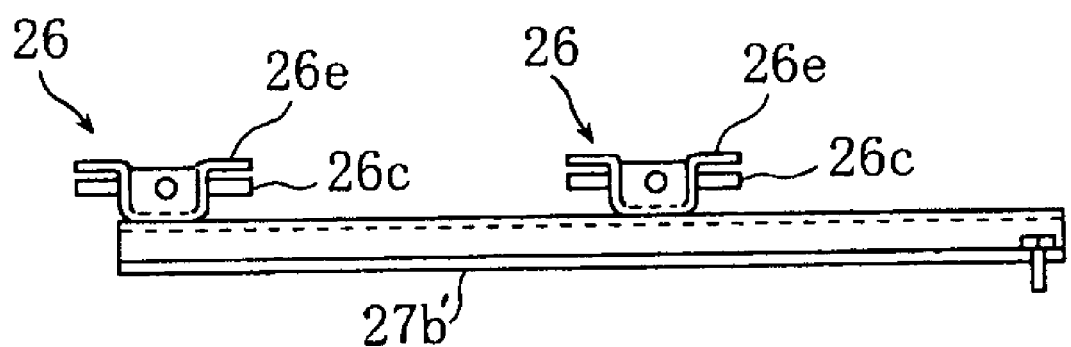
FIG. 22 is a front view of the seat rail member and the seat bracket.

As shown in FIG. 11, The center frame 11 is essentially rectangular in the plan view, and comprises: front and rear cross pipes 11a and 11b that are made from round pipes that extend in the direction of width of the vehicle; left and right center main pipes 11c and 11d, made out of square pipes, connecting front and rear cross pipes 11a and 11b at the center portion in the direction of width of the vehicle; and left and right side pipes 11e and 11f, made out of round pipes, connecting at the outside edge portions in the direction of width of the vehicle.

As shown in FIG. 11, an engine bracket 11g, for mounting the engine unit 6 is also provided between the left and right center main pipes 11c and 11d. Additionally, a floor bracket 11h, for supporting on which is supported a front floor 5a that extends rearward following the center [sic: front] panel 5 is provided between the left and right center main pipes 11c and 11d and the left and right side pipes 11e and 11f.

Figure 4:
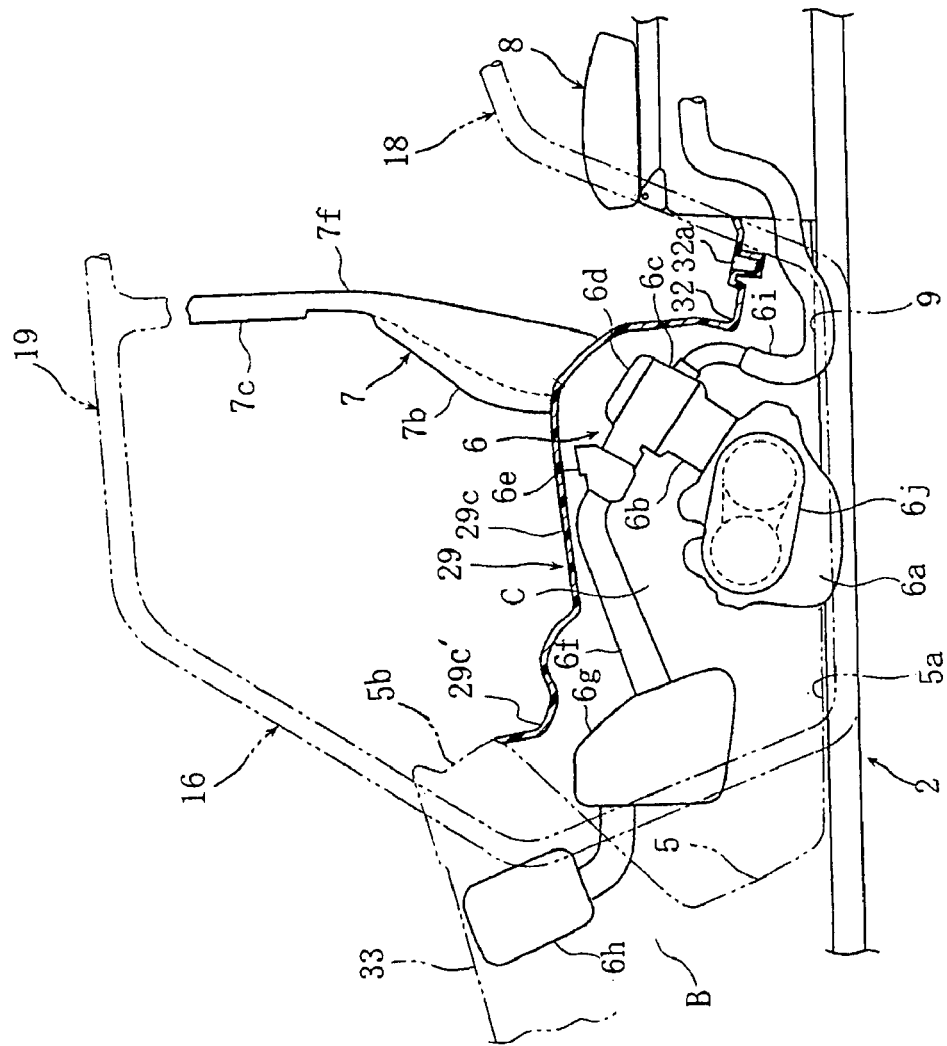
FIG. 4 is a cross-sectional diagram along the section IV-IV in FIG. 7, illustrating the relationships between the center console and the engine unit.

As shown in FIG. 4, the engine unit 6 has a structure that can be summarized as a cylinder body 6b, a cylinder head 6c, and a head cover 6d being joined together facing upward at the rear diagonal of the vehicle on the rear portion of the top surface of a crankcase 6a. On the left side portion of the crankcase 6a is formed a transmission case 6j that houses a V-belt-type continuously variable transmission. In addition, a throttle body 6e is connected to the front wall, in the front/back direction of the vehicle, of the cylinder head 6c. The vacuum pipe 6f is connected to this throttle body 6e, with a surge tank 6g interposed in the middle of the vacuum pipe 6f, with an air cleaner 6h connected at the upstream end thereof. An exhaust pipe 6i is also connected to the rear wall, in the front/back direction of the vehicle, of the cylinder head 6c. Additionally, a transmission case 6j that houses a V-belt-type continuously variable transmission is provided on the left side portion of the crankcase 6a.

The engine unit 6 is disposed in an interior space C of the center console 29. The center console 29 comprises a left side wall 29a, a right side wall 29b, and a top wall 29c, and extends in the rearward direction from the center portion, in the direction of width of the vehicle, of the front panel 5 to the rear of the rear end portion of 7g of a seat cushion portion 7a of the front seat 7. Furthermore, as illustrated in FIG. 6, the side portion above the transmission case 6j of the engine unit 6 is covered from above and from the left and right sides by a top wall 29c and by a left and right side walls 29a and 29b of the center console 29.

Figure 5:
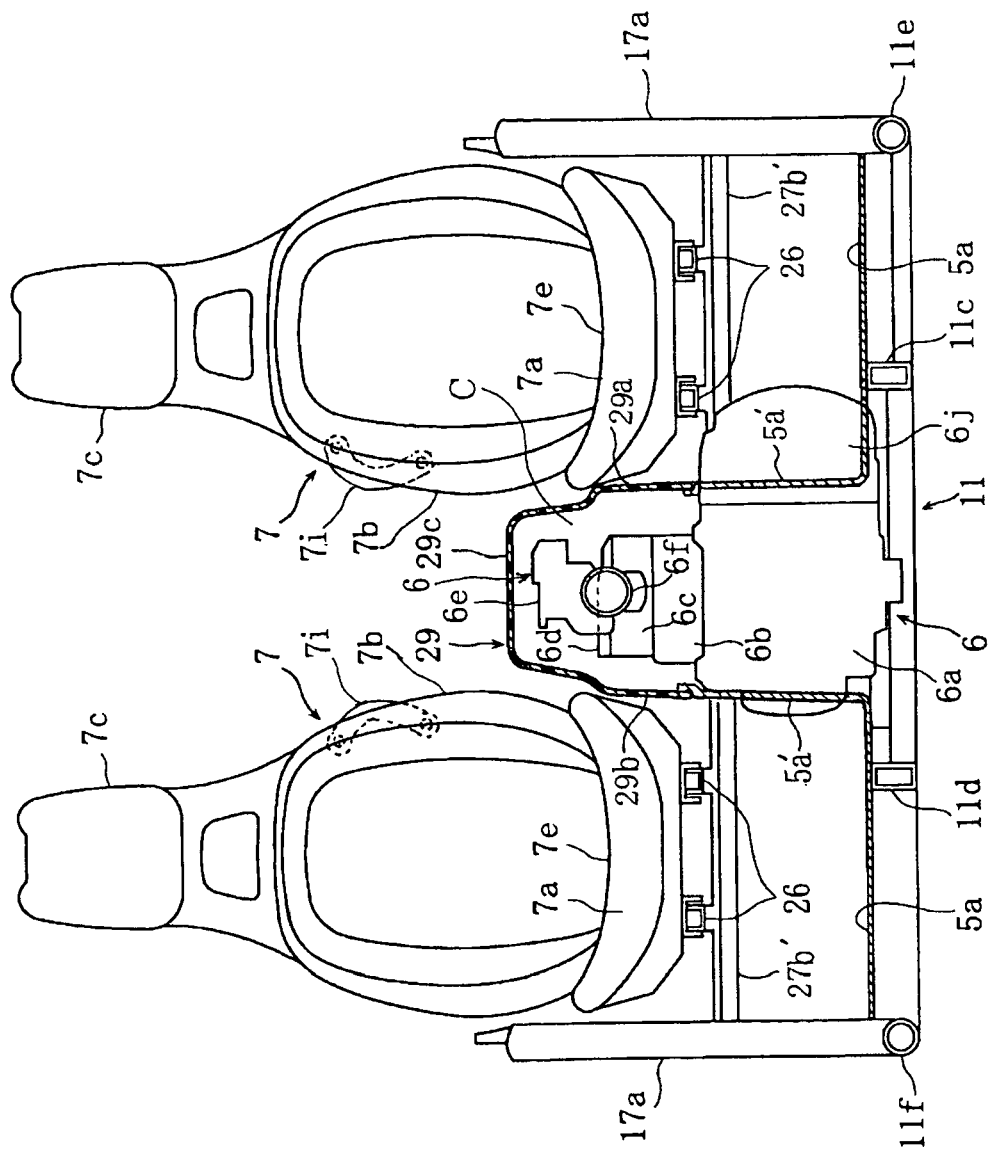
FIG. 5 is a cross-sectional diagram along the section V-V in FIG. 3, illustrating the relationship between the dispositions of the seats, the center console, and the engine.

Additionally, as illustrated in FIG. 5, the portions of the left and right side walls 29a and 29b of the center console 29 that are further forward from the front seat 7 are connected flush to the left and right extension portions 5a' of the front floor 5a. Thus, the left and right extension portions 5a' structure a portion of the left and right side walls of the portion of the center console 29 that is forward of the front seat 7. Note that in the portion of the center console 29 that is between the left and right front seats 7 and 7 there is no portion corresponding to the extension portion, and enabling the interior space C communicates with the space D below the left and right front seats 7 and 7. In the present embodiment, the left and right side walls of the center console forward of the front seat 7 are formed independently using the extension portion 5a'; however, they may instead be formed integrally with the left and right side walls 29a and 29b. Additionally, in the rear portion of the cabin, an extension portion of the rear floor 9 similarly rises upwards, and is connected to the left and right side walls 29a and 29b.

Figure 9:
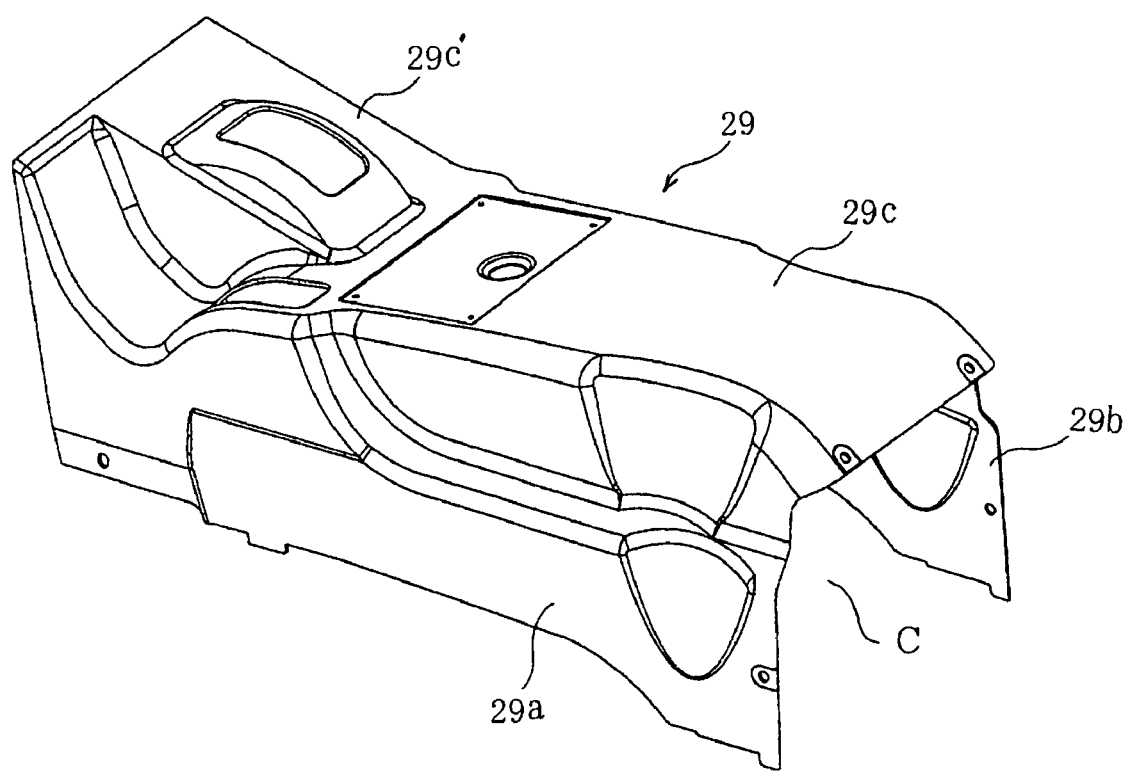
FIG. 9 is an oblique view of the center console.

As shown in FIG. 9, Consequently, the left and right side walls of the portions of the center console 29 that are forward from the front seat and are to the rear of the front seat are formed so as to be longer in the vertical direction than the left and right side walls of the center console 29 between the front seats 7 and 7.

Figure 3:
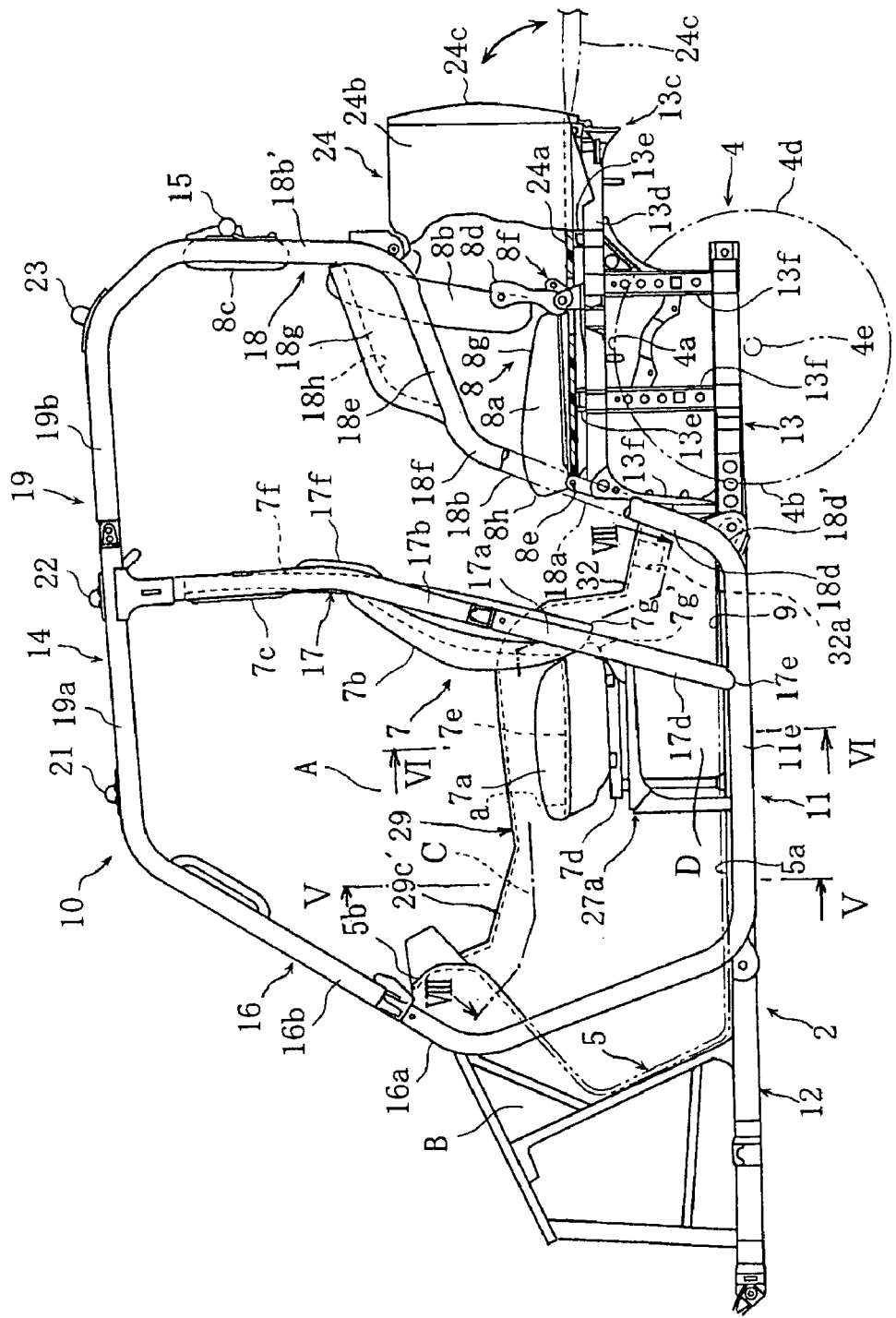
FIG. 3 is a left side view illustrating the vehicle body frame, the roof support, the roof member, and the seats.
Figure 6:
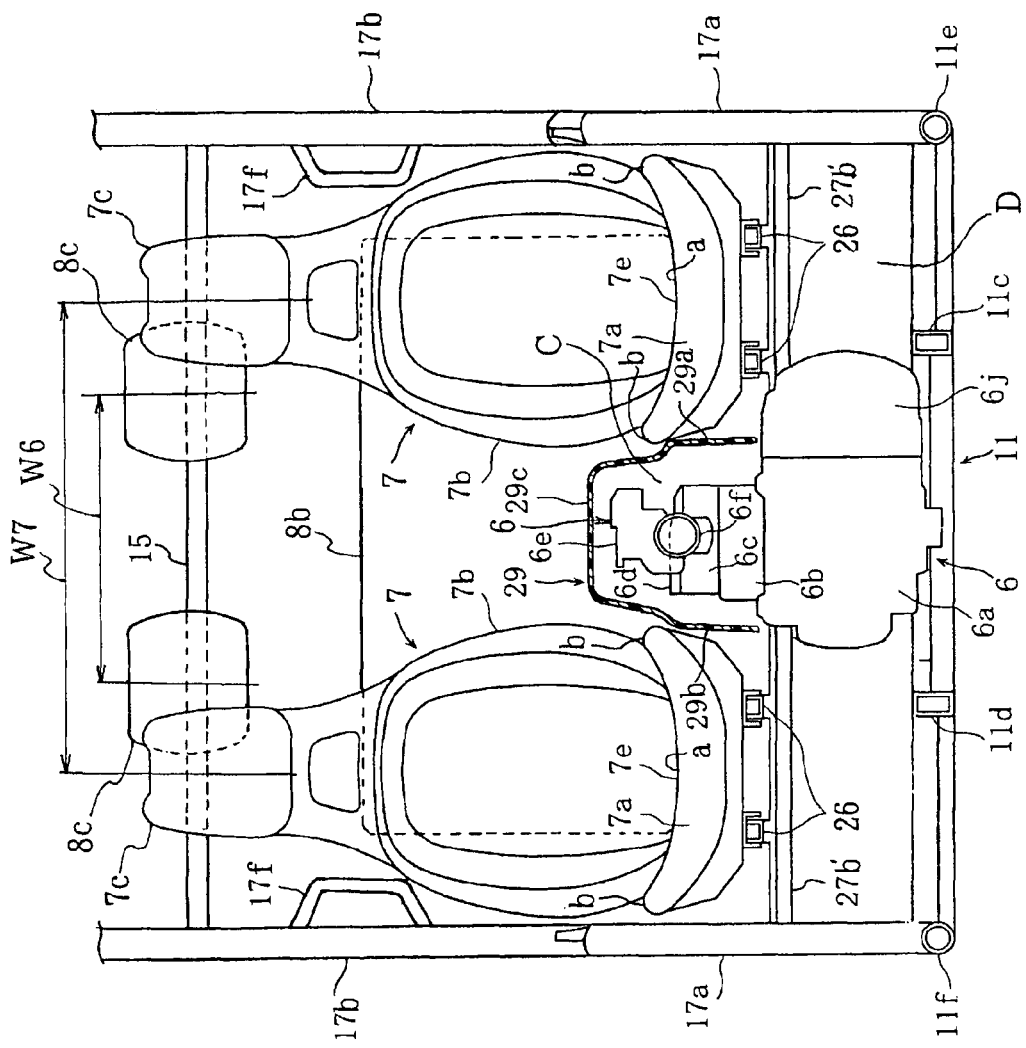
FIG. 6 is a cross-sectional diagram along the section VI-VI in FIG. 3, illustrating the relationships between the dispositions of the seats, the center console, and the engine.
Figure 7:
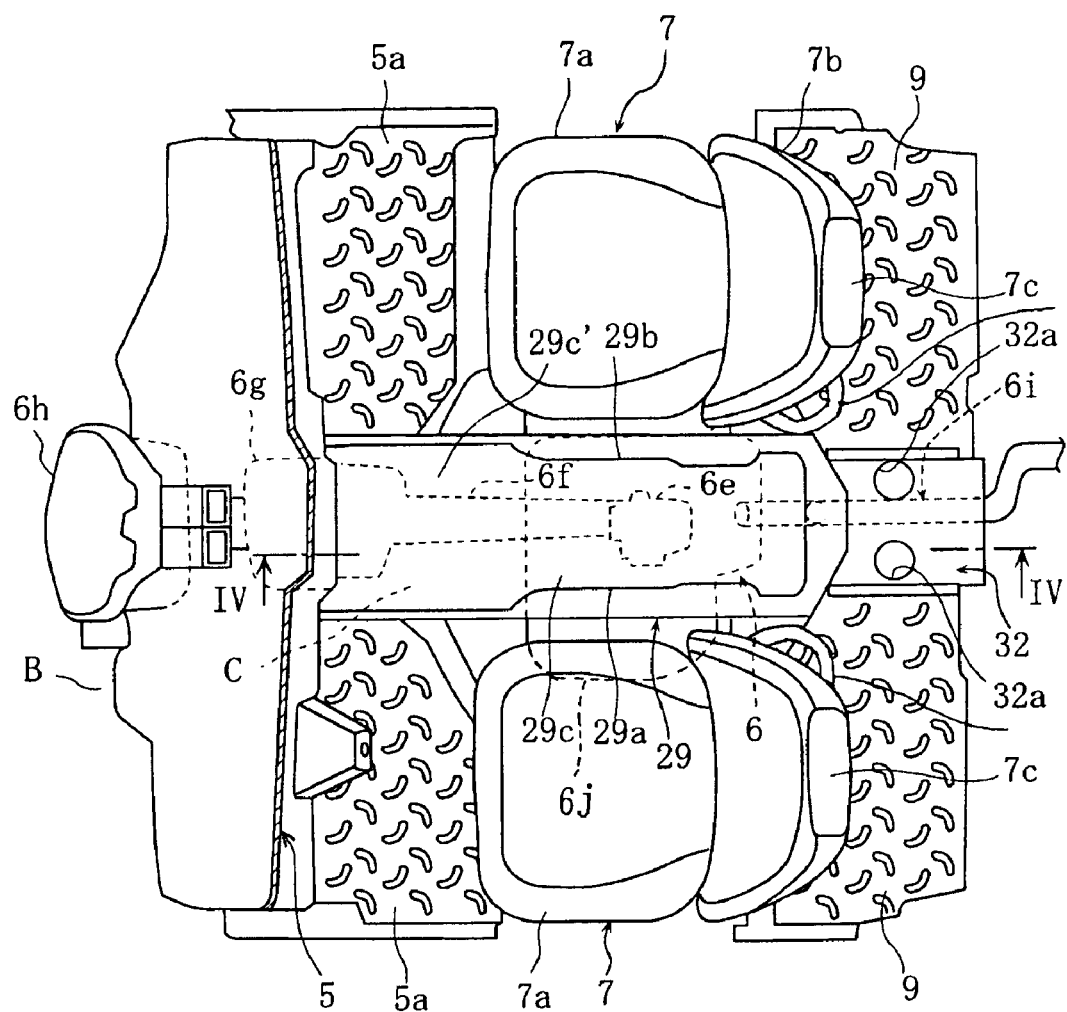
FIG. 7 is a plan view illustrating the relationships between the dispositions of the floor, the seats, and the center console.
Figure 8:
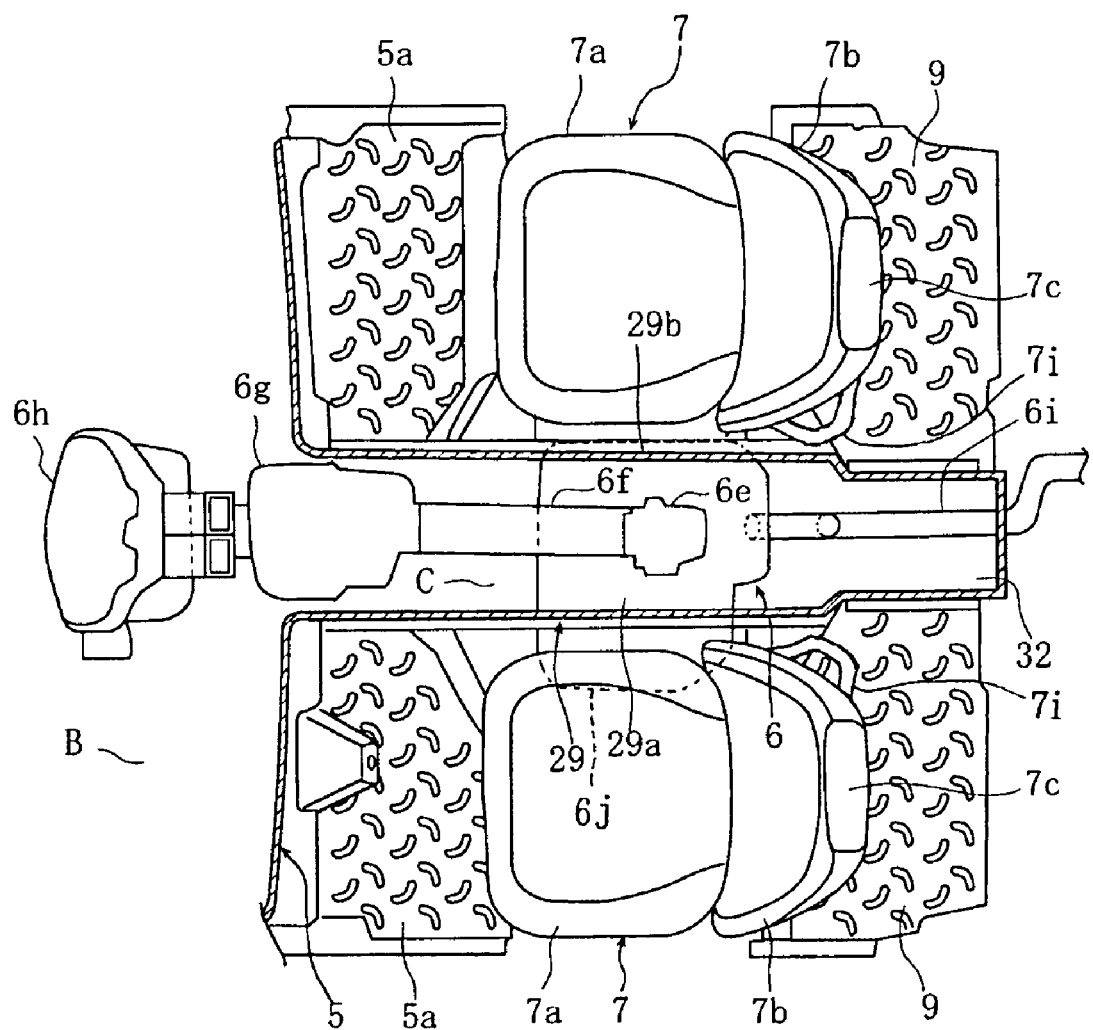
FIG. 8 is a cross-sectional diagram along the section VIII-VIII in FIG. 3, illustrating the relationships between the dispositions of the floor, the seats, and the center console.

As shown in FIGS. 3, 6 and 9, center console preferably has a special shape for further enhancing the openness of the cabin. The top wall 29c of the center console 29 is positioned at a position that is higher than the center portion (the bottom edge) a, and the left and right edge portions (top edges) b, in the direction of width of the vehicle, of the seating surface 7e of the seat cushion portion 7a of the front seat 7, and positioned at a position that is lower than the top end 5b of the front panel 5.

The portion of the top wall 29c of the center console 29 that is to the rear of the front panel 5 and that is forward of the front seat 7 is an inclined wall 29c' that is inclined at an angle that is upwards towards the front, so as to be higher further towards the front.

Controls that are operated by the operator, specifically a high/low switching lever 31a of the transmission and a hand brake lever 31b are disposed on the inclined wall 29c'. Note that 30 is a steering wheel.

Additionally, at the back end portion of the center console 29, a rear tunnel portion 32 is formed so as to be continuous with the center console 29. This rear tunnel portion 32 is positioned in a position that is to the rear of the front seat 7, and that is lower than the seating surface 7e of the front seat 7. A cup holder 32a for the rear seat passenger is formed in the rear tunnel portion 32, and the bottom portion of this rear tunnel portion 32 extends to, or to the rear of, the exhaust pipe 6i. Moreover, the top wall of the rear tunnel portion 32 extends in the vertical direction, and connects to the back ends of the top wall 29c and the left walls 29a and 29b of the center console 29. That is, the rear wall of the center console 29 is formed through the top wall of the rear total portion 32 extending upward.

As shown in FIGS. 1 and 3, the interior space C of the center console 29 communicates with the space B that is covered by a hood 33, so as to be able to open and close, forward of the front panel 5. Furthermore, the interior space C of the center console 29 communicates with the space D below the left and right front seats 7 and 7.

The throttle body 6e that is connected to the engine unit 6, the vacuum pipe 6f, and the surge tank 6g are disposed within this interior space C, and the air cleaner 6h is disposed within the interior space B.

The frame is illustrated in FIGS. 1, 2, 3, 11, 13 and 14. The front frame 12 comprises left and right front main pipes 12a and 12b that extend rearward from the portion wherein connects the left and right center main pipes 11c and 11d of the cross pipe 11a. These left and right front main pipes 12a and 12b extend angled towards the inside from the connecting portion, and then extend rearward in parallel with the center line of the vehicle. Front wheels 3 are supported, via front arms, on this portion that extends in parallel, so as to be able to sway freely.

The rear frame 13 has left and right rear main pipes 13a and 13b, extend to the rear from the portion that wherein the left and right center main pipes 11c and 11d of the cross pipe 11a are connected, and a cargo bed frame 13c that is disposed above the rear main pipes 13a and 13b.

The left and right rear main pipes 13a and 13b that extend angled towards the inside towards the back from the connecting portion, and then extend further towards the rear in parallel with the center line of the vehicle. The rear wheels 4 are supported, via a rear arm, on the portion that extends rearward, so as to be able to sway freely up and down.

Additionally, the cargo bed frame 13c is formed through the connection of the rear main pipes 13a and 13b, left and right lengthwise frames 13d and 13d that extend in parallel, and a plurality of cross frames 13e that extend in the direction of width of the vehicle, when viewed from the side of the vehicle. Given this, the cargo bed frame 13c is secured, so as to be positioned above the rear main pipes 13a and 13b, through a plurality of leg members 13f.

Additionally, a cargo bed 24 is positioned on the cargo bed frame 13c. This cargo bed 24 comprises a bottom wall portion 24a that is placed on top of the cargo bed frame 13c, left and right side wall portions 24b and 24b that are formed integrally so as to rise upwards from the left and right edge portions of the bottom wall portion 24a, and a door 24c that structures the back wall, and is open in the forward and upward directions.

The seat back 8b of the rear seat 8 is positioned at the front portion of the cargo bed 24, and the seat back 8b functions as the front wall of the cargo bed 24.

Additionally, at the left and right side portions of the bottom wall portion 24a, tire housings 24d are provided so as to bulge to the rear from the bottom wall portion 24a and so as to bulge towards the interior, in the direction of width of the vehicle, from the side wall portions 24b and 24b.

An important aspect of the invention is the construction and configuration of the front seats. As shown in FIGS. 5, 6, 7, 8, 1 and 17, the front seat 7 is of a so-called bucket type wherein the left and the right are separate, and the seat cushion and backrest are structured as a single unit. The left and right front seats 7 and 7 each have their respective seat cushion portions 7a, backrest portions 7b that rise up in the upward direction from the back end portions of the seat cushion portions 7a, and headrest portions 7c that are formed at the upper end portion of the backrest portions 7b.

The front seat cushion portion 7a and the front backrest portion 7b are rigidly connected by a bracket 7g so that the backrest portion 7b is able to maintain the standing orientation against the body mass of the passenger. As shown in FIG. 5, the headrest portion 7c is formed integrally with the backrest portion 7b.

Grips 7i are formed at the inner edge portions, in the direction of width of the vehicle, of the back surfaces of the backrest portions 7b of both the left and right front seats 7 and 7 for use by the passengers in the rear seat 8.

Figure 10:
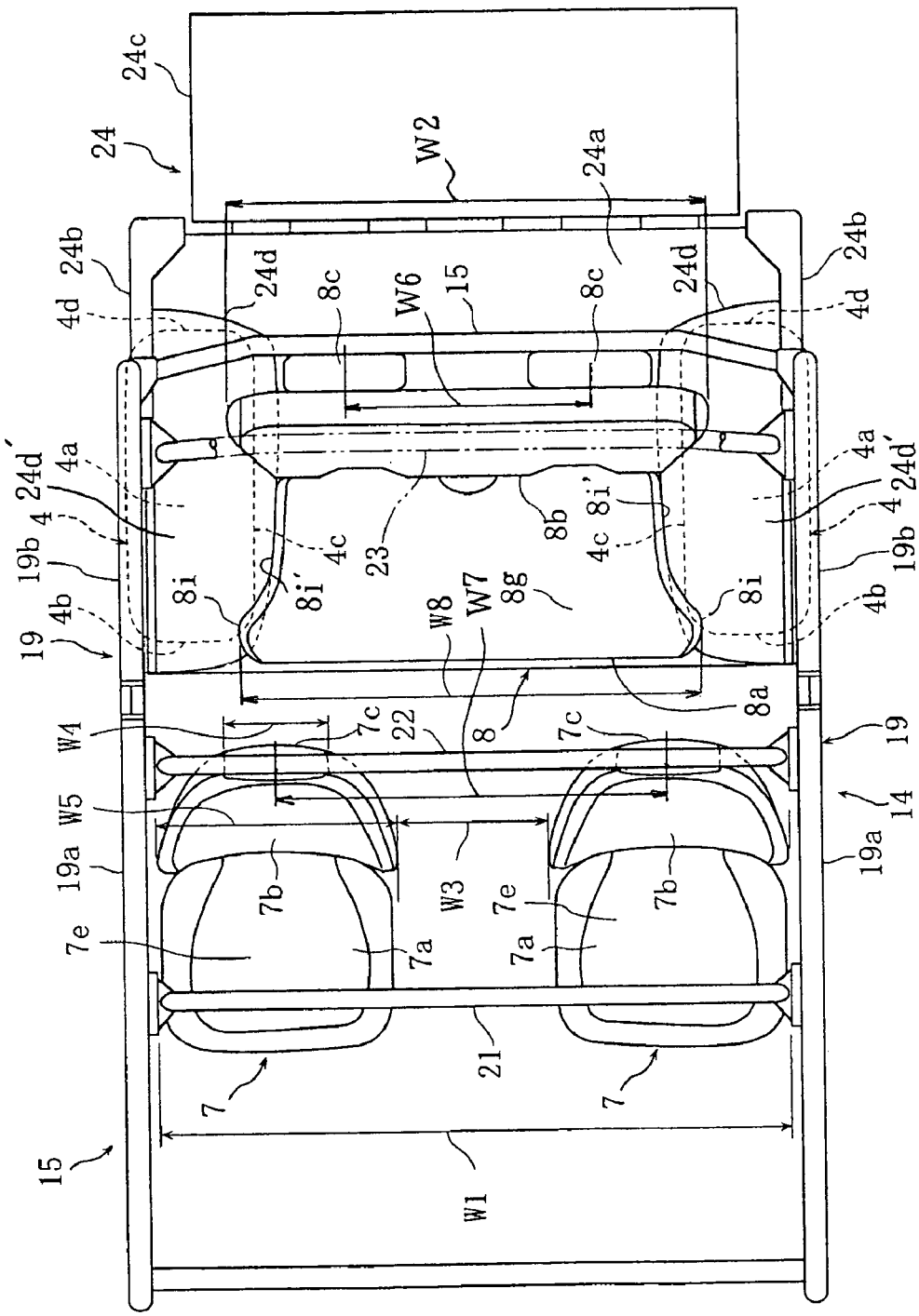
FIG. 10 is a plan view illustrating the relationships between the front seats and the rear seat.

As shown in FIG. 10, the left and right front seats 7 and 7 are disposed so as to leave a gap W3 between the seat cushion portions 7a and 7a wherein the engine unit 6 may be disposed. The width W4, in the direction of width of the vehicle, of the headrest portion 7c is formed so as to be narrower than the width W5, in the direction of width of the vehicle, of the backrest portion 7b.

As shown in FIGS. 14, 16, 18, 2 and 25, the front seat 7 is supported by the center frame 11 via a seat bracket 27. The seat bracket 27 comprises a lengthwise bracket 27a that extends in the front/back direction of the vehicle, and front and rear crosswise brackets 27b' and 27b that extend in the direction of width of the vehicle. An adjusting mechanism 25 enables the position in the front/back direction of the vehicle to be adjusted, and wherein the adjusted position can be locked.

The front/back position adjusting mechanism 25 includes a pair of left and right slide rails 26 and 26 that support the seat cushion portion 7a so as to be able to slide in the front/back direction of the vehicle. Seat bracket 27 that supports the slide rail 26 rigidly on the center frame 11. A locking mechanism 28 may lock the seat cushion portion 7a in a specific position.

The left and right slide rails 26 and 26 are disposed so as to bridge between the front and back cross brackets 27b' and 27b, and are fastened to the front and back cross brackets 27b' and 27b by bolts 26g.

Additionally, the slide rails 26 have rear portions 26a and forward portions 26b that are U-shaped in their cross sections, and are attached to the seat brackets 27 so that the openings thereof are facing upwards. In the rear portions 26a are disposed locking pins (rod-shaped members) 26c so as to pass through in the direction of width of the vehicle. These locking pins 26c protrude towards the inside and towards the outside, in the direction of width of the vehicle, from the rear portions 26a of the slide rails 26.

On the open edge portions of the forward portions 26b of the slide rails 26, slide flange portions 26e, for supporting the front seat 7 slidably, are formed by bending towards the inside and the outside. These slide flange portions 26e are held slidably by retaining members 28f that are attached to the bottom surface of the front seat 7.

The locking mechanism 28 includes a rotating rod 28a disposed so as to be able to rotate at the bottom surface 7a' of the seat cushion portion 7a. A pair of left and right locking pawls (locking members) 28b, rigidly attached to the rotating rod 28a can interlock removably with the locking pins 26c; and a latch 28c is rigidly attached to the rotating rod 28a, enabling the rotating rod 28a to be rotated by a hand motion.

Rotating rod 28a is supported rotatably by retaining member 28f that is secured rigidly by being bolted to the bottom surface 7a' of the front seat 7, and is biased by a biasing spring 28d in the direction in which the locking pawl 28b interlocks with the locking pin 26c.

A locking groove 28g is formed in the retaining member 28f, so that the locking groove 28g can interlock with the outward protruding portion 26d' of the locking pin 26c from above. With this locking groove 28g interlocked with the outward protruding portion 26d', when the locking pawl 28b interlocks with the inward protruding portion 26d of the locking pin 26c, the front seat 7 will be locked at that position.

On the other hand, when the front seat 7 is to be moved in the forward or backward direction, the locking pawl 28b is released from the inward protruding portion 26d, and at least the rear portion of the front seat 7 is lifted slightly upward to remove the locking groove 28g of the retaining member 28f from the outward protruding portion 26d', enabling movement in the forward or backward direction in this state.

The latch 28c is provided with an operating portion 28e to enable or disable the rotation of the latch 28c. This operating portion 28e is disposed so as to slide in the direction of width of the vehicle along a slide groove 28h that is formed in the latch 28c. A locking piece 28i on the operating portion 28e is able to lock to and unlock from a locking indentation portion 28j, which is formed in the position wherein the slide mechanism 28h can be unlocked, and a locking indentation portion 28k which is formed in a position that prevents unlocking.

Furthermore, an indentation portion 7h for allowing the rotation of the operating portion 28e is also provided at the bottom surface 7a' of the seat cushion portion 7a. When the locking pawl 28b is unlocked, then the interlocking of the locking piece 28i with the locking indentation portion 28k is undone by pushing this locking piece 28i forward, and the operating portion 28e moves to the unlocked side. In this state, rotating the latch 28c upward causes the operating portion 28e to enter into the indentation portion 7h, performing the unlocking operation. Alternatively, when the operating portion 28e is moved to the locking site, then the operating portion 28e is blocked by the bottom surface 7a' of the seat cushion portion 7a, so the latch 28c cannot be rotated, and thus the locked state is maintained. In this way, an unlocking preventing mechanism, for preventing the rotation of the latch 28c to the unlocked side, is structured from the operating portion 28e, the indentation portion 7h, and so forth.

The rear seat 8 is of the so-called bench type, and includes a single seat cushion portion 8a that extends in the direction of width of the vehicle so as to be able to seat both the left and the right passenger; a single backrest portion 8b that, similarly, extends in the direction of width of the vehicle so as to be able to support the backs of both the left and the right passengers; and headrest portions 8c and 8c, which are formed independently on the left and the right.

The backrest portion 8b is disposed so as to overlap, from above, the back edge portion of the seat cushion portion 8a, and is attached so as to be able to rotate forward via a bracket 8d at the back edge portion thereof.

The seat cushion portion 8a of the rear seat 8, is disposed at a position that, when viewed from above, is between the left and right tire housings 24d and 24d. Precisely, the left and right edge portions 8i and 8i of the seat cushion portion 8a are disposed so as to overlap the tire housings 24d. Furthermore, the portion 8i', which is the seat cushion portion 8a excluding the left and right edge portions 8i, is positioned towards the inside, in the direction of width of the vehicle, from the interior edge portion 4c of the tire housings 24d, and, by extension, from the rear wheels 4.

The headrest portions 8c are separate from the backrest portion 8b in the upward direction. The headrest portion 8c is attached to a rear cross pipe 15, described below. The front portion of the bottom surface of the rear seat cushion portion 8a is supported so as to be able to rotate to the front or to the rear by a rotating shaft 8e at the front edge portion of the cargo bed frame 13c. The rear edge portion of the rear seat cushion portion 8a is provided with a rear seat lock member 8f that locks and unlocks the rear seat 8 from the cargo bed frame 13c.

As shown in FIG. 10, the width dimension W2, in the direction of width of the vehicle, of the outside edges of both the left and the right of the backrest portion 8b of the rear seat 8 is set so as to be smaller than the width dimension W1, in the direction of width of the vehicle, of the left and right front seats 7 and 7. Additionally, the headrest portions 8c and 8c of the rear seat 8 are disposed so that the gap W6, in the direction of width of the vehicle, is narrower than the gap W7, in the direction of width of the vehicle, of the headrest portions 7c and 7c of the front seats 7, and are thus disposed further towards the interior, in the direction of width of the vehicle. Thus, as shown in FIG. 10, in the preferred embodiment, a center line drawn from the cent of each rear seat headrest portions 8c towards the front of the vehicle passes adjacent the interior edges of headrest portions 7c and 7c of front seats 7 through gap W7. Additionally as shown in FIG. 6, seats 7 are preferably contoured such that the transition between backrest portion 7b and headrest 7c in the integrated unibody design of seat 7 produces a seat neck that starts at a seat shoulder, which is generally at the height equal to the rear backrest portion 8b, and transitions towards the exterior of the cabin disposed between the centerline of the respective rear headrests and the frame body providing for an unobstructed frontal view by rear seated passengers.

Additionally, the width dimension W8, in the direction of width of the vehicle, of the seating surface 8g upon which the passenger is seated, in the rear seat 8 is set to be smaller than the width dimension W1, in the direction of width of the vehicle, of the left and right front seats 7 and 7, and smaller than the width dimension W2, in the direction of width of the vehicle, of the backrest portion 8b of the rear seat 8. Additionally, the seating surface 8g is disposed in a position that is lower than the top edge 24d' of the tire housings 24d. Seating surface 8g in the present embodiment means the portion whereon the passenger can sit without obstruction. For example, it would be difficult to sit if the seating surface 8g were provided all the way to the top surfaces of the tire housings 24d. That is, the tire housings 24d are formed so as to be higher the further towards the outside, in the direction of width of the vehicle, so that merely extending the seating surface to the outside on the left and the right would not cause it to function as a seating surface because it would be difficult to sit upon the extended portion on the tire housing. Because of this, the width dimension W8 of the seating surface 8g of the rear seat 8 is set so as to be narrower than the width dimension W1 of the front seat 7. Thus, the passenger in the rear seat 8 will sit in a position that is shifted towards the center of the vehicle from the passenger in the front seat 7. In addition, the front seats 7 and 7 are split offset from each other creating a gap W3 opened there between them, wherein the engine unit 6 may be disposed. Because of this, the passenger seated in the rear seat 8 is able to secure an adequate field of view in the forward direction of the automobile within the gap between the left and right front seats 7 and 7.

Additionally, because the width, in the direction of width of the vehicle, of the backrest portion 8b is wider than the width, in the direction of width of the vehicle, of the back portion of the rear seating surface 8g of the rear seat 8, which is the position of the buttocks of the passengers, the width of the seating surface 8g is made more compact, and when the passengers are seated, the shoulders and arms of the passengers, which are positioned further to the outside than the buttocks, can be supported, improving the level of comfort for the passengers.

As shown in FIGS. 1, 2, 3, and 12, the cabin structuring member 10 includes front roof supports (first roof supports) 16, provided on the left and right side portions of the center frame 11; center roof supports (second roof supports) 17; rear roof supports (third roof supports) 18; and a roof member 14 that connects the top portions of the top, center and rear roof supports 16, 17, and 18. Cabin A with a feeling of openness is structured from this cabin structuring member 10.

The front roof supports 16 are disposed on the front edge portions on the left and right side portions of the center frame 11, and, more specifically, are structured from a pair of left and right round pipes that extend upwards from the front edge portion of the left and right side pipes 11e and 11f. Additionally, the front roof supports 16 are divided into lower portions 16a and upper portions 16b, and are connected via a plurality of bolts 16c that penetrate through in the front/back direction of the vehicle.

The center roof supports 17 are provided in the center portion, in the front/back direction, at the left and right side portions of the center frame 11, further towards the rear, in the front/back direction of the vehicle, from the front roof supports 16, and, more specifically, are connected to the middles of the left and right side pipes 11e and 11f, and are structured from a pair of left and right round pipe members extending upward there from. The center roof supports 17 are divided into lower portions 17a and upper portions 17b, and are connected by a plurality of bolts 17c that penetrate through in the front/back direction of the vehicle.

The rear roof supports 18 are disposed at the rear end portions on the left and right side portions of the center frame 11, further towards the rear, in the front/back direction of the vehicle, from the center roof supports 17, and, specifically, are structured from a pair of left and right round pipes that extend upwards from the rear end portion of the left and right side pipes 11e and 11f. The rear roof supports 18 are divided into lower portions 18a and upper portions 18b, and are connected by a plurality of bolts 18c that penetrate through in the front/back direction of the vehicle.

The roof member 14, comprises left and right side roof pipes 19 and 20, which extend in the front/back direction of the vehicle and which connect together the upper end portions of the front, center, and rear roof pipes 16, 17, and 18, and further comprises front, center, and rear cross roof pipes 21, 22, and 23, extending in the direction of width of the vehicle, which connect together the front end portions, connect together the center portions, and connect together the rear end portions of the left and right side roof pipes 19 and 20.

The left side roof pipe 19 is divided into a forward portion 19a and a rear portion 19b, and is connected by a plurality of bolts 19c that penetrate though in the direction of width of the vehicle. Similarly, the right side roof type 20 is divided into a forward portion 20a and a rear portion 20b, and is connected by a plurality of bolts 20c that penetrate through in the direction of width of the vehicle.

The front, center, and rear cross roof pipes 21, 22, and 23 are connected by a plurality of bolts 21a, 22a, and 23a, which penetrate in the direction of width of the vehicle, to the left and right side roof pipes 19 and 20.

Here the front roof supports 16, when viewed from the side of the vehicle, are formed with bends so as to resemble "<" signs overall, and, in the vicinities of the bent portions 16d, are divided into the lower portions 16a and the upper portions 16b.

Additionally, the center roof supports 17, when viewed from the side of the vehicle, are disposed so as to be essentially coincident with the backrest portions 7b of the front seats 7. Furthermore, the lower portions 17d of the center roof supports 17, which are lower than the headrest portions 7c of the front seats 7 are inclined so as to be angled further forward the further down. Additionally, the bottom edge portions 17e of the center roof supports 17 are positioned so as to be further forward from the rear end portion 7f of the front seat 7. In more detail, the bottom edge portions 17e are positioned so as to be further forward than the rear end portions 7g' of the seat cushion portion 7a and the bottom end portion 7g of the backrest portion 7b.

Additionally, the center roof supports 17 are provided with grip portions 17f that can be grasped by the passengers of the rear seat 8. These grip portions 17f are disposed at positions that are higher than the seating surfaces 7e of the front seat 7, and the seating surface 8g of the rear seat 8.

In addition, the lower portions 18d of the rear roof support 18, which are positioned lower than the seating surface 8g of the rear seat 8, are inclined backwards the higher up so as to be essentially parallel with the lower portions 17d of the center roof supports 17, positioned so as to be further back the higher on the lower portions 18d. The upper end portions 18f of the lower portions 18d are positioned to the rear of the front end portion 8h of the rear seat 8.

The middle portions 18e, of the rear roof supports 18, which extend upward from the upper end portions 18f of the lower portions 18d, are inclined backwards even more than are the lower portions 18d. Additionally, these middle portions 18e, when viewed from the side of the vehicle, extend towards the rear, in the front/back direction of the vehicle, cutting across the backrest portion 8b of the rear seat 8.

Additionally, the bar-shaped members 18h are disposed higher than the middle portions 18e, and these bar-shaped members 18h are covered by plastic covers 18g. The covers 18g structure surfaces that are wide in the front/back direction of the vehicle and in the vertical direction.

Here front doors 34 are disposed on the left and right sides, in the direction of width of the vehicle, of the foot space of the front seat 7. Note that 36 is a side cover that is disposed to the side of the front seat 7. Also, rear doors 35 are disposed on the left and right sides in the direction of width of the vehicle, of the foot space of the rear seat 8.

All terrain vehicle 1 as set forth in the present form of embodiment incorporates front seats 7 that are formed independently for the left and for the right. Each seat cushion portion 7a, seat back portion 7b, and headrest portion 7c are formed integrally for each of the front seats 7. The seats are positioned within the Cabin A offset forming a space of a gap W3 between the left and right backrest portions 7b and 7b, making it possible to secure the field of view in the forward direction for the passenger of the rear seat 8 through this space, which, as a result, can ensure that the passenger in the rear seat 8 can secure a feeling of openness for the cabin.

Additionally, because the seat cushion portion 8a and the backrest portion 8b are formed integrally, the backrest portion 8b can be caused to stand erect in resistance to the body mass of the passenger, obviating any cross members to support the backrest portion 8b, making it possible for the rear seat 8 to be moved closer to the front seat 7, with the result that the length of the vehicle can be shortened, enabling the vehicle to be made more compact.

Additionally, for the rear seat 8, the width dimension W2, in the direction of width of the vehicle, of the backrest portion 8b and the width dimension W8, in the direction of width of the vehicle, of the seating surface 8g are formed so as to be less than the width dimension W1, in the direction of width of the vehicle, of the left and right front seats 7 and 7; nevertheless, because this is a bench-type seat, it is able to seat two people, on the left and on the right.

Additionally, the width dimension W8, in the direction of width of the vehicle, of the seating surface 8g of the rear seat is formed so as to be narrower than the width dimension W1, in the direction of width of the vehicle, of the left and right front seats 7 and 7, so the passengers in the rear seat 8 will be seated at positions that are shifted towards the center of the vehicle from the passengers in the front seat 7. In addition, as described above, the front seats 7 and 7 are split to the left and to the right, disposed so as to provide a gap W3 wherein the engine unit 6 can be disposed. Because of this, the passengers seated in the rear seat 8 can secure an even larger field of view in the forward direction of the vehicle through the space between the left and right front seats 7 and 7, and can thus secure a feeling of openness in the cabin.

Additionally, the spacing of the left and right headrests 8c of the rear seat 8 is narrower than the spacing of the headrests 7c of the left and right front seats 7, and positioned towards the inside, in the direction of width of the vehicle, thus securing the forward field of view and feeling of openness for the passengers seated on the rear seat 8 while supporting the heads thereof.

In addition, the seating surface 8g of the rear seat 8 is positioned between the tire housings 24d and 24d, disposed at a position that is lower than the top edge 24d' of the tire housings 24d, making it possible to secure the vertical stroke length of the rear wheels 4 while securing the passenger vehicle space for the rear seat passengers.

On the other hand, while the seat cushion portion 8a of the rear seat 8 is formed so as to be narrow in the width dimension so as to be disposable between the left and right tire housings 24d and 24d, the left and right edge portions 8i and 8i of the seat cushion portion 8a are disposed over the front portions of the tire housings 24d. Because of this, the rear seat 8 can be disposed between the tire housings 24d and 24d while securing the seating surface area of the rear seat 8.

That is, the tire housings 24d are formed in a shape that slopes downward towards the front so as to be lower the further forward from the top edge 24d', so there is no need for the left and right edge portions 8i of the front edge of the seating surface 8g to be higher than the seating surface of the rear portion, and thus the left and right edge portions 8i can also function as seating surfaces, and it is because of this that it is possible to secure the seating surface.

In addition, the headrest portions 8c of the rear seat 8 are not only disposed separated from the backrest portion 8b in the upward direction, but also the headrest portions 8c are attached to the rear cross pipe 15, so that when the rear seat 8 is folded down, there is no need to remove the headrest portions 8c from the backrest portion 8b, making it possible to simplify, by that much, the operation of folding down.

Furthermore, grips 17f are provided in the center roof supports 17, and grips 7i Furthermore, because a front/back position adjusting mechanism 25 that enables the adjustment of the position of the front seat 7 in the front/back direction of the vehicle is provided, the position of the front seat 7 can be adjusted to a position wherein it is possible to obtain a feeling of openness, depending on the passenger in the front seat, making it possible to increase the comfort of the front seat passenger.

Additionally, the front/back adjusting mechanism 25 is structured from a slide rail 26 that supports the front seat 7 so as to be able to move in the front and back directions, a plurality of locking pins 26c that are provided on the slide rail 26, and a locking pawl 28b that can interlock with the locking pins 26, and thus the position of the front seat 7 in the forward/back direction can be adjusted using a simple mechanism.

The locked state of the locking pawl 28b can be maintained because an operating portion 28e for disengaging the interlock between the locking pawl 28b and the locking pin 26c is provided. In this case, the operating portion 28e can be moved to the unlocked position through pushing on the locking piece 28i.

Note that while a vehicle that is provided with a pair of left and right rear wheels was described in the embodiment set forth above, the present invention can also be applied to vehicles having two pairs of left and right rear wheels, or in other words, 6-wheeled vehicles.

Additionally, while in the present embodiment a case was explained wherein a front seat 7 and a rear seat 8 were provided, the present invention can also be applied to a vehicle wherein only a front seat is provided.

Additionally, while the seat cushion portion 7a, the backrest portion 7b, and the headrest portion 7c of the left and right front seats 7 were fabricated integrally in the example of embodiment set forth above, identical effects can be obtained when the seat cushion portion is shared across the left and right front seats, and the backrest portions and headrests are fabricated independently for the left and the right.

Furthermore, in the example of embodiment set forth above, the explanation was for a case wherein, when the front seat 7 it is positioned at the back end, the headrest portion 7c of the front seat 7 is coincident with the center roof supports 17, when the vehicle is viewed from the side; however, in the present invention, the headrest portion and the center roof supports may be positioned so as to be coincident when the front seat 7 has been moved to a specific position.

We claim:

1. A vehicle comprising:
   a vehicle body frame;
   a pair of left and right front wheels carried by said vehicle body frame;
   a pair of left and right rear wheels carried by said vehicle body frame;
   a front roof support carried by said vehicle body frame;
   a central roof support carried by said the vehicle body frame;
   a rear roof support carried by said vehicle body frame;
   a roof member that connects to the front roof support, the central support, and the rear roof support thereby defining a cabin space;
   a front panel provided to the rear of the front wheels in the forward/back direction of the vehicle and at least partially disposed within said cabin space;
   an engine and a transmission provided to the rear of the front panel in the forward/back direction of the vehicle;

a front seat provided to the rear, in the forward/back direction of the vehicle, of the front panel, the front seat comprising:
  a left and right seat cushion portion,
  a left and right backrest portion provided integrally with the left and right seat cushion portions, respectively, and
  a left and right headrest portion provided integrally with the left and right backrest portions, respectively, wherein
  the integral left backrest portion and left headrest portion are fabricated into a shape that is independent of the integral right backrest portion and right headrest portion thereby creating a gap between said left and right backrest portions and said left and right headrest portions;
a rear seat provided to the rear of the front seat in the forward/back direction of the vehicle, the rear seat comprising:
  a left and right rear headrest portion fabricated independently of each other so that a spacing therebetween in a direction of width of the vehicle is narrower than a spacing between the left and right front seat headrest portions; wherein
  a centerline drawn through each of said left and right rear headrest portions, respectively, passes through the gap defined by said left and right front seat headrest portions.

2. The vehicle of claim 1, wherein a width of said left and right front headrest portions is narrower than a width the left and right front backrest portions, respectively, in the direction of width of the vehicle, and the left and right front backrest portions are positioned so that at least a portion thereof is coincident with the central roof support, when viewed from the side of the vehicle.

3. The vehicle of claim 2, wherein the rear seat comprises:
  a first seat cushion portion extending in the direction of width of the vehicle, whereon a plurality of passengers can sit; and
  a single backrest, extending in the direction of width of the vehicle, so as to be able to support the backs of a plurality of passengers, with at least a portion thereof disposed above the seat cushion portion.

4. The vehicle of claim 1, wherein the left and right rear headrest portions are provided on a cross member carried by said rear roof support.

5. The vehicle of claim 1, wherein grips are carried by said central roof support that can be grasped by a passenger.

6. The vehicle as set forth in claim 1, wherein the front seat is provided with a grip, on the back surface thereof, that can be grasped by a passenger.

7. The vehicle as set forth in claim 1, wherein the width, in the direction of width of the vehicle, of a seating surface whereon the passengers sit in the rear seat is narrower than the width of the front seat in the direction of width of the vehicle.

8. The vehicle as set forth in claim 7, wherein the seating surface of the rear seat is disposed between left and right tire housings that are disposed above the rear wheels; and the seating surface of the rear seat is lower than the top edge of the tire housing.

9. The vehicle as set forth in claim 1, wherein the front seat is provided with a forward/back position adjusting mechanism capable of adjusting the position in the forward/back direction of the vehicle.

10. The vehicle as set forth in claim 9, wherein the front/back position adjusting mechanism comprises:
  a rail member, disposed under the front seat, for supporting the front seat so as to be able to move forward and backward;
  a plurality of rod-shaped members disposed on the rail member, disposed so as to be spaced apart in the forward/back direction and so as to protrude in the direction of width of the vehicle; and
  a locking member that protrudes in the downward direction from the bottom portion of the front seat, capable of interlocking with the rod-shaped members.

11. The vehicle as set forth in claim 10, wherein the front/back position adjusting mechanism is further provided with a lock releasing preventing mechanism for preventing the movement of the locking member to a released position of the interlock.

12. A vehicle comprising:
  a vehicle body frame;
  a pair of left and right front wheels carried by said vehicle body frame;
  at least a pair of left and right rear wheels carried by said vehicle body frame;
  a front roof support structure including a pair of offset left and right pipe members extending vertically from said vehicle body frame;
  a center roof support structure including a pair of offset left and right pipe members extending vertically from said vehicle body frame;
  a rear roof support structure including a pair of offset left and right pipe members extending vertically from said vehicle body frame;
  a roof member interconnecting said front, center and rear roof support structures thereby defining a cabin space;
  a left front seat disposed within said cabin space including seat portion integrated with a backrest portion and integrated with a headrest portion;
  a right front seat disposed within said cabin space including a seat portion integrated with a backrest portion and integrated with a headrest portion;
  said backrest portion and said headrest portion of said left front seat being offset from said backrest portion and headrest portion of said right front seat in a width direction of the vehicle thereby defining a rear viewing sight line extending in a longitudinal direction of the vehicle between an inner side edge of said headrest portion of said left front seat and an inner side edge of said headrest portion of said right front seat; and
  a rear headrest associated with a rear seat disposed within said cabin space; wherein
  a center of the rear headrest in the width direction of the vehicle is aligned with said rear viewing sight line in the longitudinal direction of the vehicle.

13. The vehicle of claim 12, wherein said left front seat portion and said right front seat portion are offset defining a gap, and a console is disposed within said gap.

14. The vehicle of claim 13, wherein an engine is carried by said vehicle frame and bounded at an upper periphery by said console.

* * * * *